(12) United States Patent
Brodeur

(10) Patent No.: US 7,909,636 B2
(45) Date of Patent: Mar. 22, 2011

(54) ADJUSTABLE CONNECTOR FOR ELECTRICAL CABLE

(75) Inventor: Marc Brodeur, St Jean sur Richelieu (CA)

(73) Assignee: Thomas & Betts International, Inc., Wilmington, DE (US)

( * ) Notice: Subject to any disclaimer, the term of this patent is extended or adjusted under 35 U.S.C. 154(b) by 274 days.

(21) Appl. No.: 12/082,902

(22) Filed: Apr. 15, 2008

(65) Prior Publication Data

US 2008/0261428 A1 Oct. 23, 2008

Related U.S. Application Data

(60) Provisional application No. 60/925,395, filed on Apr. 20, 2007.

(51) Int. Cl.
*H01R 13/56* (2006.01)

(52) U.S. Cl. .................. 439/446; 285/184; 285/181

(58) Field of Classification Search .............. 439/446, 439/170, 489, 491, 6, 10, 11; 285/181, 184, 285/272; 174/651
See application file for complete search history.

(56) References Cited

U.S. PATENT DOCUMENTS

| | | |
|---|---|---|
| 327,877 A | 10/1885 | Hodges |
| 954,504 A | 4/1910 | Drew |
| 1,125,642 A | 1/1915 | Blanchard |
| 1,285,849 A | 11/1918 | Walling |
| 1,880,098 A | 9/1932 | Mair |
| 2,447,947 A | 8/1948 | Larson ..................... 285/122 |
| 2,479,580 A | 8/1949 | Marco |
| 2,557,507 A | 6/1951 | Lang, Jr. |
| 2,581,047 A | 1/1952 | Salmond et al. |
| 2,791,451 A | 5/1957 | Rostan |
| 4,807,370 A | 2/1989 | Trimble |
| 5,064,226 A | 11/1991 | Klas ........................... 285/184 |
| 5,165,734 A | 11/1992 | Smith ......................... 285/276 |
| 5,507,535 A | 4/1996 | McKamey ................... 285/168 |
| 5,816,624 A | 10/1998 | Smith ......................... 285/276 |
| 5,887,908 A | 3/1999 | White |
| 6,034,325 A | 3/2000 | Nattel ........................... 174/59 |
| 6,114,631 A | 9/2000 | Gretz ........................... 174/65 |
| 6,262,369 B1 | 7/2001 | Marik et al. .................. 174/64 |
| 6,380,483 B1 | 4/2002 | Blake ....................... 174/65 R |
| 6,561,549 B1 | 5/2003 | Moris et al. |
| 6,581,974 B1 | 6/2003 | Ragner et al. |
| 6,768,057 B2 | 7/2004 | Blake ....................... 174/65 R |
| 6,932,390 B1 | 8/2005 | Gretz |
| 6,957,832 B1 | 10/2005 | Pannekoek |
| 7,394,021 B2 | 7/2008 | Magno, Jr. |
| D586,006 S | 2/2009 | Pannekoek |
| 7,658,418 B1 * | 2/2010 | Elbaz et al. ................ 285/153.1 |
| 7,699,355 B2 * | 4/2010 | Vitel et al. ................... 285/184 |
| 2007/0246258 A1 | 10/2007 | Magno ........................ 174/651 |

* cited by examiner

*Primary Examiner* — Xuong M Chung Trans
(74) *Attorney, Agent, or Firm* — Hoffmann & Baron, LLP

(57) ABSTRACT

An adjustable connector for an electrical cable formed from a body, a hub and a coupling nut. The body has a flanged end with a scalloped edge and a face that is angularly disposed to the longitudinal axis and a cable connecting end. The hub includes an end with a mating surface that has a dovetail extending around about one half of the outer perimeter and the mating surface is angularly disposed to the central axis. The coupling nut has first and second ends and an opening extending therebetween with internal threads. The dovetail on the mating surface of the hub is adapted to receive the flanged end of the body and the coupling nut is threaded onto the hub to secure the flanged end in the dovetail.

26 Claims, 19 Drawing Sheets

C-C

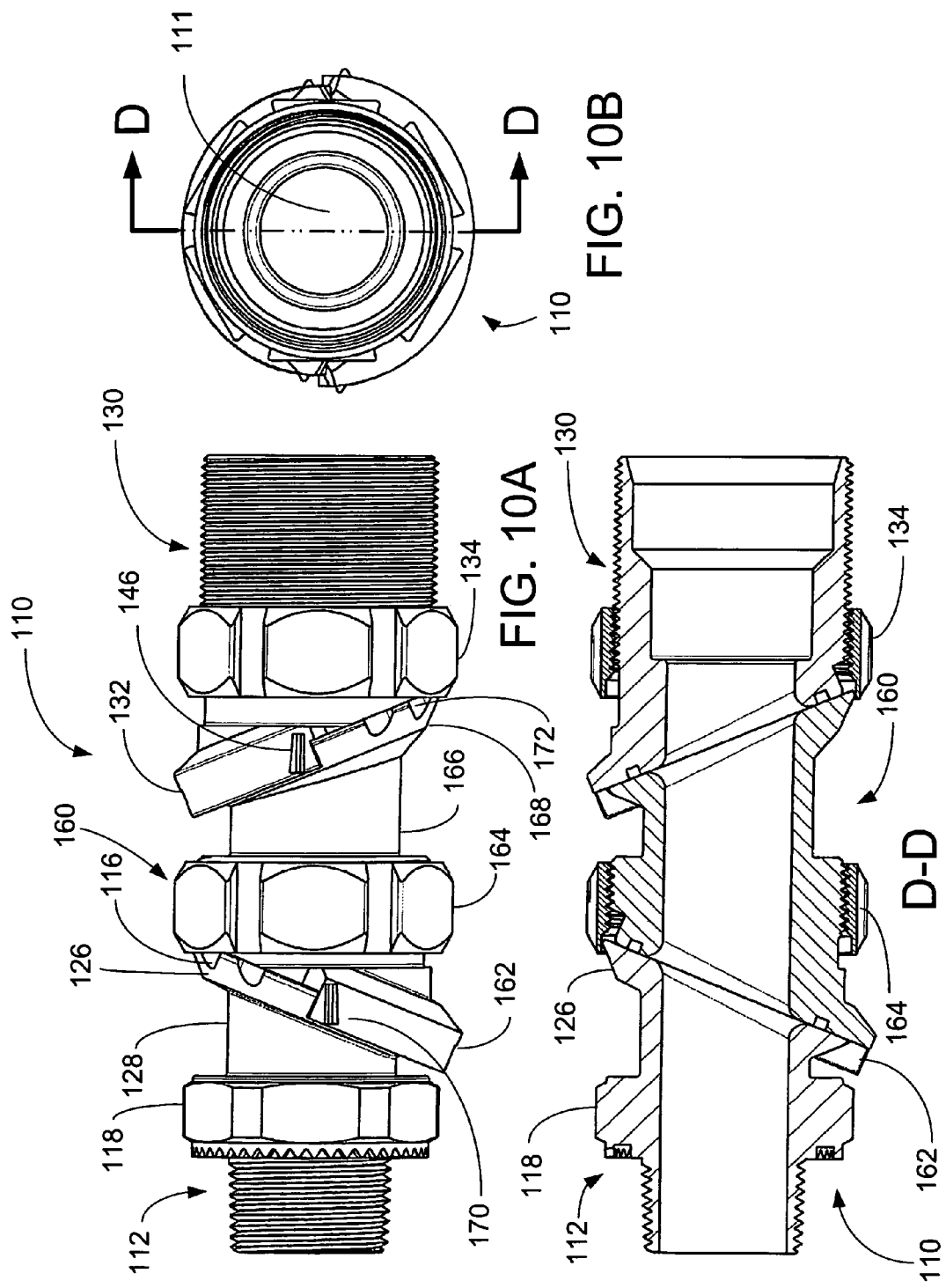

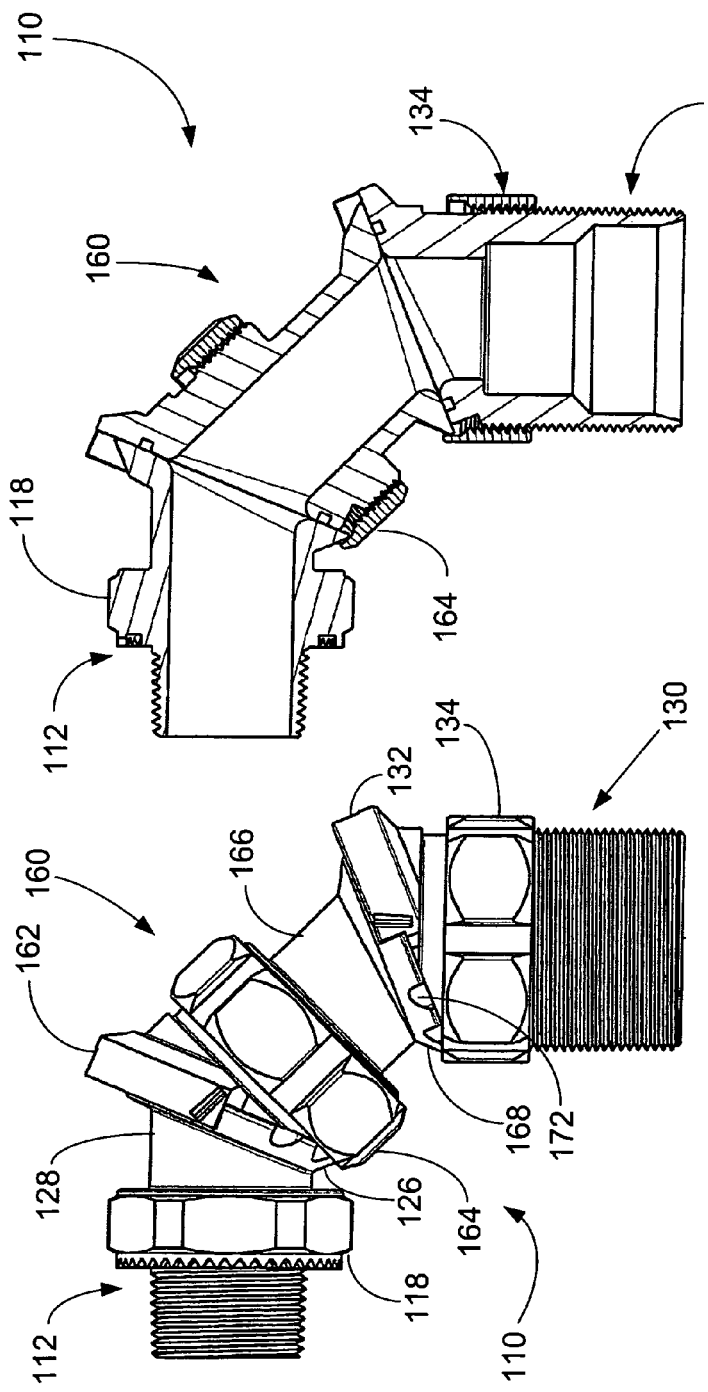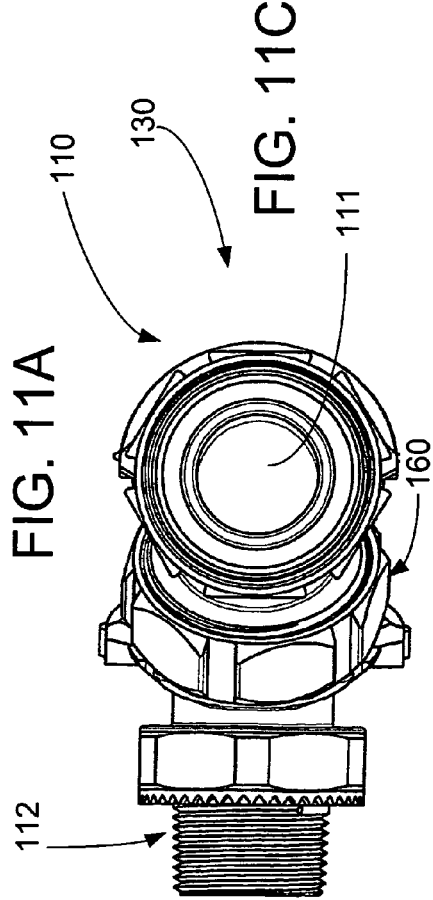

ADJUSTABLE CONNECTOR FOR ELECTRICAL CABLE

This application claims priority from provisional application Ser. No. 60/925,395, filed on Apr. 20, 2007, which is incorporated herein in its entirety.

FIELD OF THE INVENTION

The present invention relates to fittings for electrical cables. In particular, the present invention relates to adjustable connectors that are used to change the direction of electrical cables.

BACKGROUND OF INVENTION

Armored electrical cables can be used in a wide variety of applications. They are particularly suited for applications that require the wiring to be isolated from the surrounding environment. The construction of the cables permits them to be used in environments which are referred to as hazardous locations, as well as in non-hazardous locations. Traditionally, wiring runs in hazardous locations use rigid metal conduit. However, when permitted by the applicable electrical codes, flexible armored cable may be used in place of rigid conduit. In general, rigid conduit is more difficult and more expensive to install than armored cable. Therefore, users prefer to use armored cable whenever the electrical codes permit.

Armored cable, typically, includes an electrically conductive flexible metal casing which protects the conductors running within from abrasion, impacts and the like. In addition, the metal casing permits the cable to be grounded throughout its length. An outer plastic or rubber sheath typically covers the metal casing thereby adding water proof protection to the cable, as well as protecting the metal sheathing from corrosive elements. Although armored cable is more flexible and easier to install than rigid conduit, its bend radius can make it difficult to form tight bends and, hence, installation in certain locations requires elbows or other fittings.

In the past, a 90-degree bend in an armored, electrical cable was accomplished using either an assembly of different approved fittings (e.g., a pull elbow connected to a straight fitting) or a short single 90 degree fitting. Similarly, fittings for other bend angles were used and, as a consequence, a user was required to stock fittings for a variety of different angles. This was found to be expensive and inconvenient.

Accordingly, there is a need for a fitting for changing the direction of an armored, electrical cable, as well as other types of electrical cables, that can be quickly and easily installed. There is a further need for an adjustable connector for armored and other types of electrical cables that can make bends in an armored, electrical cable over a range of at least from 0-90 degrees and preferably from 0-135 degrees.

SUMMARY OF THE INVENTION

In accordance with the present invention, an adjustable connector for armored and other types of electrical cables is provided. The adjustable connector includes a body, a hub and a coupling nut. The body has a longitudinal axis, opposing ends and an aperture extending therebetween. One end is flanged with a scalloped edge and a face that is angularly disposed to the longitudinal axis and the other end is a cable connecting end. The hub has a central axis, first and second ends and an opening extending therebetween. The first end has a mating surface that is angularly disposed to the central axis and the mating surface has a dovetail extending around about one half of the outer perimeter. The dovetail can be formed as one continuous dovetail or a plurality of spaced, individual dovetails. In a preferred embodiment, the dovetail is formed as two separate dovetails with a notch in between. The coupling nut has first and second ends and an opening extending therebetween with internal threads. The dovetail on the mating surface of the hub is adapted to receive the flanged end of the body and the coupling nut is threaded onto the hub to secure the flanged end in the dovetail.

In preferred embodiments, the face of the flange on one end of the body is angularly disposed to the longitudinal axis at an angle of about 45 degrees and the mating surface on the first end of the hub is angularly disposed to the central axis at an angle of about 45 degrees. When the face of the flange is connected to the mating surface, the body and the hub can be rotated so that the connector forms various bend angles. The adjustable connector can be oriented so that the body is connected to the hub and the longitudinal axis is substantially parallel to the central axis or the longitudinal axis is disposed with respect to the central axis at an angle of about 45 degrees, about 90 degrees or about 135 degrees, or any angle in-between.

In another embodiment, the face of the flange on the end of the body is angularly disposed to the longitudinal axis at an angle of from about 30 to 60 degrees and the mating surface on the first end of the hub is angularly disposed to the central axis at an angle of from about 30 to 60 degrees. Changing the angular disposition of the flange and the mating surface allows the connector to be oriented to provide a bend angle of from 60 degrees to 120 degrees.

The hub can have an exterior surface that is threaded in the region adjacent to the mating surface end for receiving the coupling nut. The coupling nut preferably contacts the flanged end at a point opposite the dovetail to lock the flange to the hub. The cable connecting end of the body and the second end of the hub opposite the mating surface can be threaded and adapted to receive a threaded cable fitting.

In a preferred embodiment, the flanged end has indicia of the angular disposition of the adjustable connector on its surface and the dovetail has a notch near the center. When the flanged end is secured in the dovetail and oriented to preferred angles (e.g., 45, 90, 135 or 180 degrees) the indicia is viewable through the notch. This allows the user to verify that the adjustable connector is properly oriented.

In a second embodiment of the adjustable connector, the adjustable connector includes a body, a hub and a coupling nut. The body has a longitudinal axis and includes a first cable connector end and a first mating end and an aperture extending therebetween. The first mating end has a flange with a scalloped edge and a face that is angularly disposed to the longitudinal axis. The hub has a central axis and includes a second cable connector end and a second mating end and an opening extending therebetween. The exterior surface of the hub adjacent to the second mating end is threaded and adapted to receive the coupling nut.

The second mating end of the hub has a flange that is angularly disposed to the central axis and a dovetail along the outer perimeter of the flange. Preferably, the dovetail extends around about one half of the outer perimeter. The dovetail is adapted to receive the flange of the first mating end and the coupling nut is threaded onto the hub to secure the flange of the first mating end in the dovetail. Preferably, the dovetail of the second mating end rotatably receives the flange of the first mating end. The dovetail can be located on the angularly disposed second mating end at a maximal distance from the second cable connector end and the coupling nut contacts the flange of the first mating end at a point opposite the dovetail.

The dovetail can also include an exterior surface having one or more finger grips that facilitate the joining of the two mating ends. The finger grips are formed by one or more protrusions extending radially from the dovetail or by one or more raised members on the dovetail, preferably a plurality of substantially parallel ribs.

The flange of the first mating end can have indicia of the angular disposition of the adjustable connector and the dovetail of the second mating end can have a notch. The indicia are viewable through the notch when the flange of the first mating end is secured in the dovetail.

The coupling nut has a first end with a perimetrical edge. The scalloped edge of the flange of the first mating end has a plurality of recessed portions which are positioned so that the perimetrical edge contacts one or more of the recessed portions when the coupling nut is tightened. Preferably, the recessed portions are arranged in a plurality of pairs so that two points on the perimetrical edge of the coupling nut contact one of the pairs when the body is oriented with respect to the hub at an angle of 45, 90, 135 or 180 degrees.

In a third embodiment, the adjustable connector includes a body, a hub, a first coupler and two coupling nuts. The body and the hub are the same as described above for the second embodiment. The first coupler has a longitudinal axis and includes a first mating end having a flange with a scalloped edge that is angularly disposed to the longitudinal axis, a second mating end having a flange with a dovetail angularly disposed to the longitudinal axis and an axial passage extending therebetween. The first coupling nut is threaded onto the hub and the second coupling nut is threaded onto the first coupler. The dovetail of the hub is adapted to receive the flange of the first coupler and the first coupling nut is tightened to secure the flange of the first coupler in the dovetail of the hub. The dovetail of the first coupler is adapted to receive the flange of the first mating end and the second coupling nut is tightened to secure the flange of the first mating end in the dovetail of the first coupler.

The flange on the second mating end has an outer perimeter and the dovetail extends around about one half of the outer perimeter. Similarly, the flange on the first coupler has an outer perimeter and the dovetail extends around about one half of the outer perimeter. The dovetail of the hub rotatably receives the flange of the first coupler and the dovetail of the first coupler rotatably receives the flange of the body. The flange of the body can have first indicia of the angular disposition of the body in relation to the first coupler and the dovetail of the first coupler can have a notch. The first indicia are viewable through the notch when the flange of the body is secured in the dovetail of the first coupler at predetermined orientations, such as 45, 90, 135 and 180 degrees. Similarly, the flange of the first coupler can have second indicia of the angular disposition of the first coupler in relation to the hub and the dovetail of the hub can have a notch. The second indicia are viewable through the notch when the flange of the first coupler is secured in the dovetail of the hub at predetermined orientations, such as 45, 90, 135 and 180 degrees.

The body can be connected to the first coupler and the first coupler can be connected to the hub so that the longitudinal axis of the body is substantially parallel to the central axis of the hub or the longitudinal axis of the body is disposed with respect to the central axis of the hub at an angle of about 45 degrees, about 90 degrees, about 135 degrees or about 180 degrees, or various angles from 0 to 180 degrees.

The first coupler can have a stem section that includes the first mating end and a stem end and a base section that includes the second mating end and a sleeve end. The stem end is inserted through the second coupling nut and rotatably received by the sleeve end. The stem section freely rotates with respect to the base section until the second coupling nut is tightened.

The adjustable connector can also include a second coupler that is the same as the first coupler. The second coupler can be connected to the first coupler and the body or it can be connected to the first coupler and the hub.

BRIEF DESCRIPTION OF THE FIGURES

The preferred embodiments of the adjustable cable fitting of the present invention, as well as other objects, features and advantages of this invention, will be apparent from the accompanying drawings wherein:

FIGS. 10A-C are a side view, an end view and a sectional view of an embodiment of the adjustable connector of the present invention that includes body, hub and coupler components disposed coaxially.

FIGS. 11A-C are a side view, an end view and a sectional view of an embodiment of the adjustable connector of the present invention that includes body, hub and coupler components forming a 90-degree bend.

DETAILED DESCRIPTION OF THE INVENTION

Figure 1A:
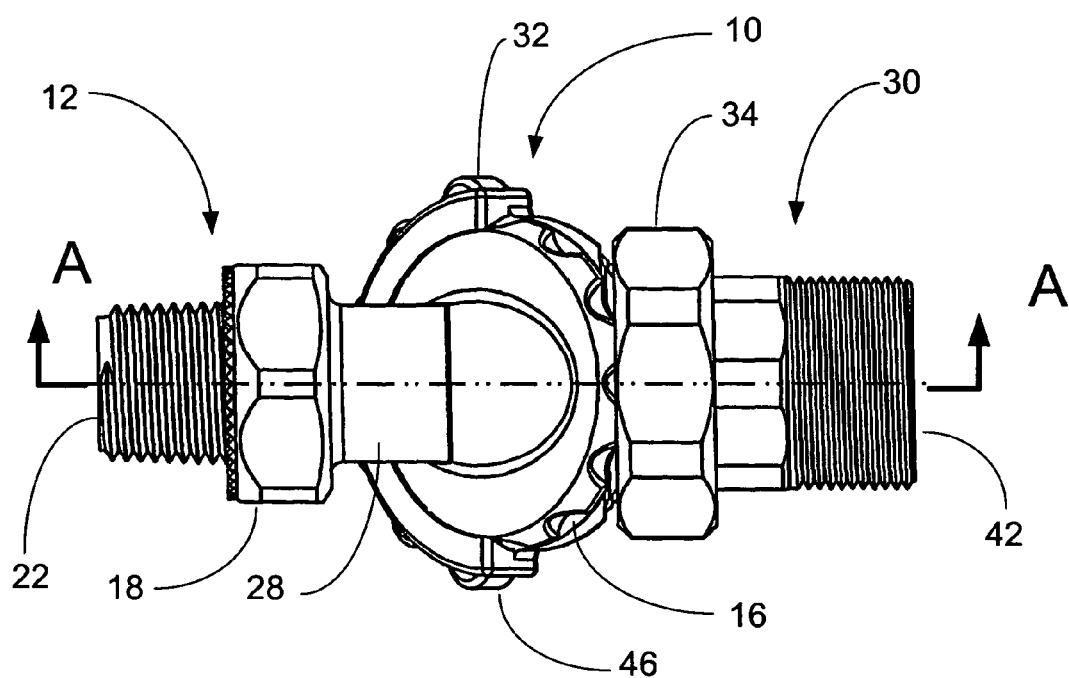
FIGS. 1A-B are a top view and a sectional view of an embodiment of the adjustable connector of the present invention in the unlocked position.

The present invention is an adjustable connector (also referred to herein as an "adjustable fitting" or "connector") that is used with armored and other types of electrical cables to make bends in a cable run. In general, armored cables are metal clad and contain one or more individually insulated conductors. Preferably, the armored, electrical cable is a flexible, interlocked aluminum armored cable having an inner PVC jacket over the insulated conductors as well as outer PVC jacket over the armor. Such cables are referred to herein as "teck cables." However, the invention is not limited to use with teck or other types of armored cables and can be used with any electrical cable. As used herein, the term "armored electrical cable" means a metal (e.g., steel, aluminum or brass) or non-metal (e.g., plastic) conduit or cable having a flexible, corrugated construction with or without interlocking helix, whether jacketed or unjacketed or lined or unlined (e.g., with a PVC jacket or liner).

The present invention relates to adjustable fittings or connectors that are used for bends in electrical cables. The connectors have two or more components that have apertures which extend substantially straight through the components. This allows the cables to be easily inserted directly into each of the straight components of the fitting without having to bend the cable to conform to the shape of the fitting, which is typically the case with elbow fittings. This eliminates the struggle of pre-bending the cable and forcing the wire bundle through a 90 degree elbow.

Traditional rigid 45 or 90-degree fittings need to be disassembled into separate components before a prepared cable is inserted and then re-assembled when the cable is in place. With regard to armored cables, "prepared cable" means an armored cable with the outer protective coating and/or the armored portion removed so that the cable is compatible with the connector. The connectors of the present invention can be disassembled into separate components and the cable inserted through the separate components or the connectors can remain assembled during cable insertion. Prior to running the cable, the adjustable connectors can be rotated into a variety of configurations to facilitate insertion of the cable by the user. In a preferred configuration, the axes of the two or more components that make up the connector are aligned and form an aperture that goes substantially straight through the connector without any bends. This "straight-through" configuration facilitates the insertion of the cable. After the cable is run and bends need to be made, the connector components are rotated (or swiveled) to form the desired angle and then locked into position with the coupling nut. The angle formed by the connector can be varied from 0 to 90 degrees before the connector is locked in final position. In some applications, the user may find it more convenient to adjust the connector to a specific angle before inserting the cable. In other applications, the user may choose not to tighten the coupling nut so that the cable and connector are not locked into position.

When a bend in an electrical cable is made, the bending of the conductors occurs only at a point inside the fitting. This is a significant improvement over the prior art elbows, wherein the entire cable run needed to be pre-bent and forced through the bending angle of the elbow. The straight-through configuration of the components of the adjustable fitting of the present invention provides openings in the body and hub that are aligned and concentric. The angularly disposed flanged end of the body and the angularly disposed flanged end of the hub each have elliptically shaped openings with a major axis (i.e., the maximum distance between the opposing sides of the opening) and a minor axis (i.e., the minimum distance between the opposing sides of the opening). When the body and hub are rotated to form different angles for the connector, the minimum opening in the connector is at least equal to the minor axis of the body or hub (whichever is smaller).

The adjustable connector includes a body and a hub rotatably coupled together so that each member can be rotated relative to the other between a first position, wherein the body and hub extend in longitudinal alignment to provide a straight connection, and a second position, wherein the longitudinal axes of the body and hub extend at a 90 degree angle with respect to the other axis to provide a 90 degree connection. The body and the hub can also be connected at any angle between the first and second positions by rotating the body and hub to a desired orientation and then tightening the coupling nut on the hub to fix the position of the body relative to the hub.

In a first embodiment, the adjustable connector has two sections, the body and the hub, and each is provided with a mating flange at their corresponding mating ends for connecting the two sections together. The faces of the mating flanges extend angularly with respect to the longitudinal axes of the body and hub, preferably at between 30 and 60 degrees and most preferably about 45 degrees. The face of each flange slidably and rotatably mates with the other one when the body is connected to the hub. One of the mating flanges (preferably on the hub) is provided with a dovetail extending along a portion of its perimetrical edge that receives the scalloped edge of the other mating flange (preferably on the body) in a dovetail relationship. Specifically, the outer surface of the edge of the scalloped mating flange slides into and is received by the dovetail on the complementary edge of the other mating flange. A coupling nut contacts the body's mating flange at a point opposite the dovetail and is tightened to secure the two mating flanges in position. Advantageously, the edges of the mating flange received by the dovetail have recessed portions (i.e., the edges are beveled) located along the edge of the mating flange in a complementary manner with the edge of the coupling nut.

The coupling nut is internally threaded and coaxially mounted around the hub proximate the flanged end. After the mating flanges are joined, the coupling nut is tightened to secure the body and hub in any desired relative angular position. In the tightened position, the coupling nut snugly fits against the scalloped outer surface at the perimetrical edge of the flange to lock the body and hub together in the desired position. (The engagement or interlocking of the edges of the coupling nut with the scalloped flange surface is discussed in more detail below.) Loosening the coupling nut permits the body and hub members to be swiveled to any angular orientation relative to one another. The slidable faces of the mating flanges allow a continuous 360-degree rotation until the coupling nut locks the body and hub in position at a selected angle.

The outer surface at the edge of the flange on the body can be advantageously provided with scallops (i.e., recessed portions or bevels) which engagingly receive the edge of the coupling nut. Preferably, the scallops are disposed in pairs so that two points along the perimetrical edge of the coupling nut engage the scallops. The locking nut in combination with the scallops firmly secures the mating flanges together and provides protection against vibration.

The adjustable connector is particularly advantageous since it provides an unbiased axial alignment of the components. Consequently, there is no offset when the cable passes through the two sections of the fitting until the sections are rotated to a desired orientation. This provides an initial straight-through connection that is advantageous, especially for cables having a large diameter. In addition, the adjustable connector can be easily disconnected, even with conductors in the fitting, since the straight-through connection facilitates disconnection of the body and the hub.

In a preferred embodiment, the outer surface of the dovetail can be provided with a handgrip to facilitate hand installation. The handgrip can be formed by one or more protrusions or ribs extending radially from the dovetail or it can be formed by one or more slots or depressions in the dovetail. The adjustable connector can be constructed from a metal or a plastic material, preferably by a molding process. In addition, the adjustable connector can include self draining capabilities through a drain hole in the hub that allows draining of the fitting when oriented at any angle.

The apertures in the body and hub can be provided with rounded interior surfaces to protect the cable from being cut or frayed by sharp edges. In addition, the fitting can be provided with a watertight O-ring for sealing the connection between the two mating flanges. The O-ring can be mounted in a substantially circular recess on the face of one of the mating flanges, preferably the hub.

For larger cables, the angular disposition of the mating flanges with respect to their longitudinal axes can be reduced to provide a more gradual bending of the cable. Preferably, the fittings for larger cables have flanges with the faces disposed at 22.5 degrees instead of 45 degrees to provide an increased bend radius. In this embodiment, two sets of 45-degree adjustable connectors are used to provide a 90-degree connection. Each connector has two mating flanges with the faces of the flanges disposed at 22.5 degrees from the axis to form the 45-degree connector. Installing the two connectors in series provides a 90 degree connection.

In another embodiment, a coupler is installed between the body and the hub of the first embodiment of the adjustable connector. One end of the coupler has a mating flange with a scalloped edged similar to the body and the other end of the coupler has a mating flange with a dovetail. The scalloped and dovetailed flanges are formed in the same manner as the flanges on the body and hub. The scalloped flange of the coupler mates with the dovetail flange of the hub and the dovetail flange of the coupler mates with the scalloped flange of the body. The coupler can also have two scalloped flanges that can be used to connect the coupler to hubs on each end. As will be appreciated by those skilled in the art, different combinations of scalloped flanges and dovetail flanges on the body, hub and coupler with their faces disposed at various angles from their axes can be used in order to provide a universal connection at any angle or a specifically shaped connection. When the coupling nut is engaged and secured in the scalloped flange, a three-member adjustable connector assembly (hub, coupling nut and body) locks all three axes of rotation XYZ of the adjustable connector and all three linear motions XYZ.

Referring to the drawings, FIGS. 1A through 9B show an embodiment of the connector 10 which includes a body 12 and a hub 30 secured together by a coupling nut 34. The body 12 has a cable connection end 22 that has a plurality of threads 20 and a neck 28 that extends from a hex fitting 18 and terminates in a flanged end 26 with a substantially flat surface 14 (FIG. 3B) that is angularly disposed to the axis of the neck 28 and has a scalloped edge 16. A cable (not shown) can be passed through the cable connection end 22 and through an aperture 24 in the flanged end 26 (FIG. 3B). The hub 30 connects to an electrical cable (not shown) on one end 42 using threads 40 on the exterior surface and has a flanged end 44 that is angularly disposed to the axis of the hub 30 and has an aperture 38 (FIG. 3A) through which the cable passes. The angular disposition of the flanged end 44 of the hub 30 corresponds to the angular disposition of the flanged end 26 of the body 12. The flanged end 44 has a dovetail 32 that extends around about one half of the outer perimeter and has a number of finger/tool grips 46 on the periphery. The flanged end 44 of the hub 30 is joined with the flanged end 26 of the body 12 with the dovetail 32 enclosing a portion of the scalloped edge 16.

Figure 4A:
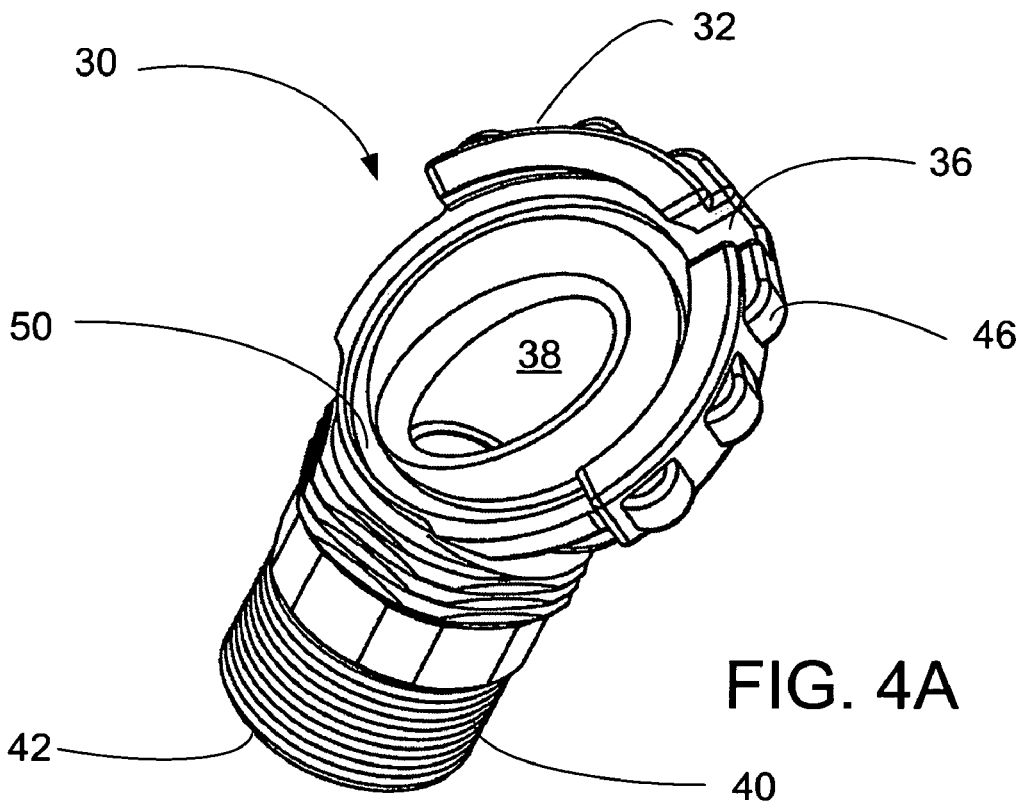
FIG. 4A is a perspective view of an embodiment of the hub component of the adjustable connector of the present invention.
Figure 5A:
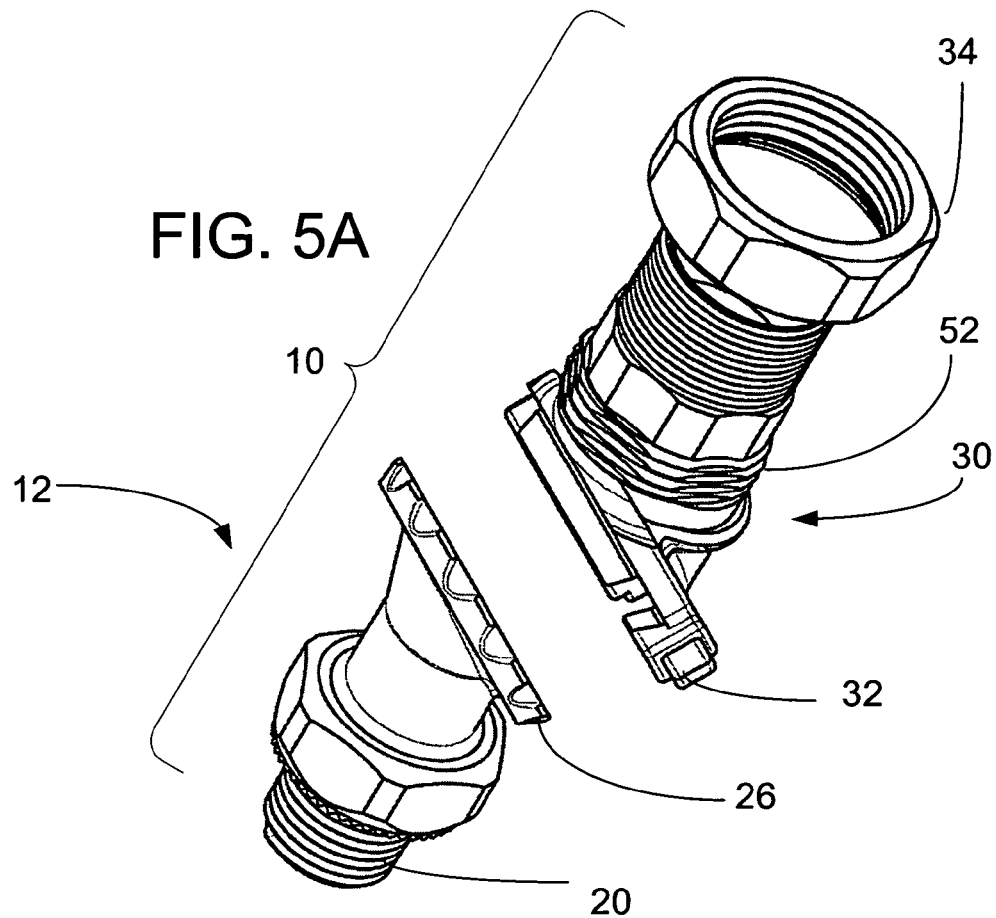
FIG. 5A is a perspective view of an embodiment of the hub and body components of the adjustable connector of the present invention with their axes in parallel relationship.
Figure 6A:
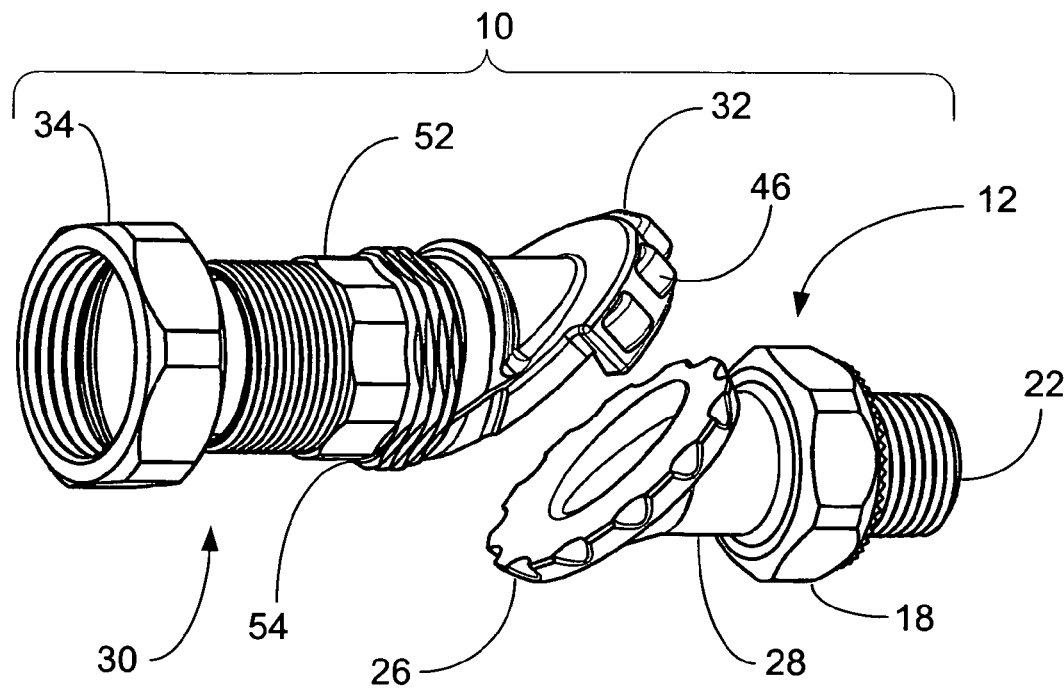
FIG. 6A is a perspective view of an embodiment of the hub and body components of the adjustable connector of the present invention with their axes in parallel relationship.

As can be seen in FIGS. 4A, 5A and 6A, the dovetail 32 is separated into two segments and has a space or gap 36 between the sections serving as a visual inspection port to insure the scalloped edge 16 is fully inserted within the dovetail 32.

Figure 1B:
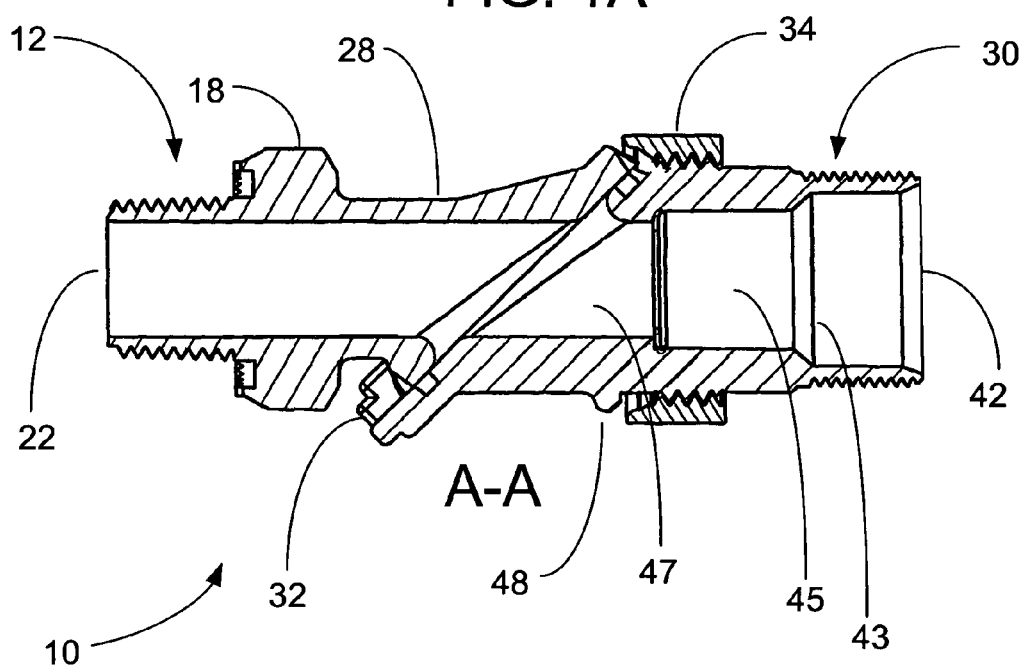
Figure 2A:
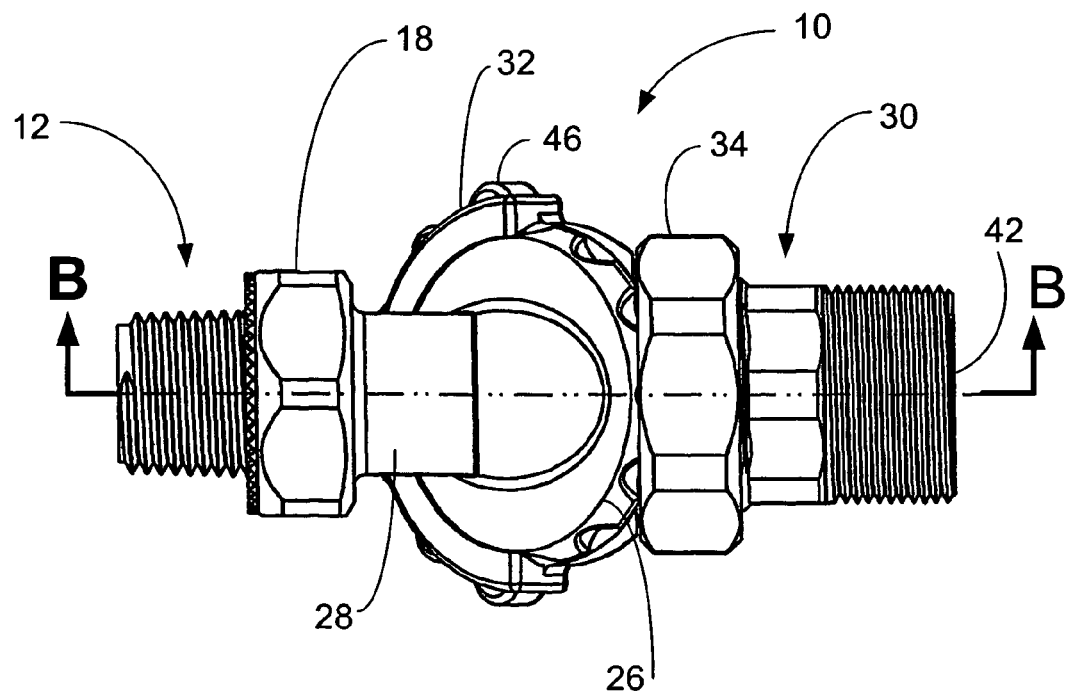
FIGS. 2A-B are a top view and a sectional view of an embodiment of the adjustable connector of the present invention in the locked position.
Figure 2B:
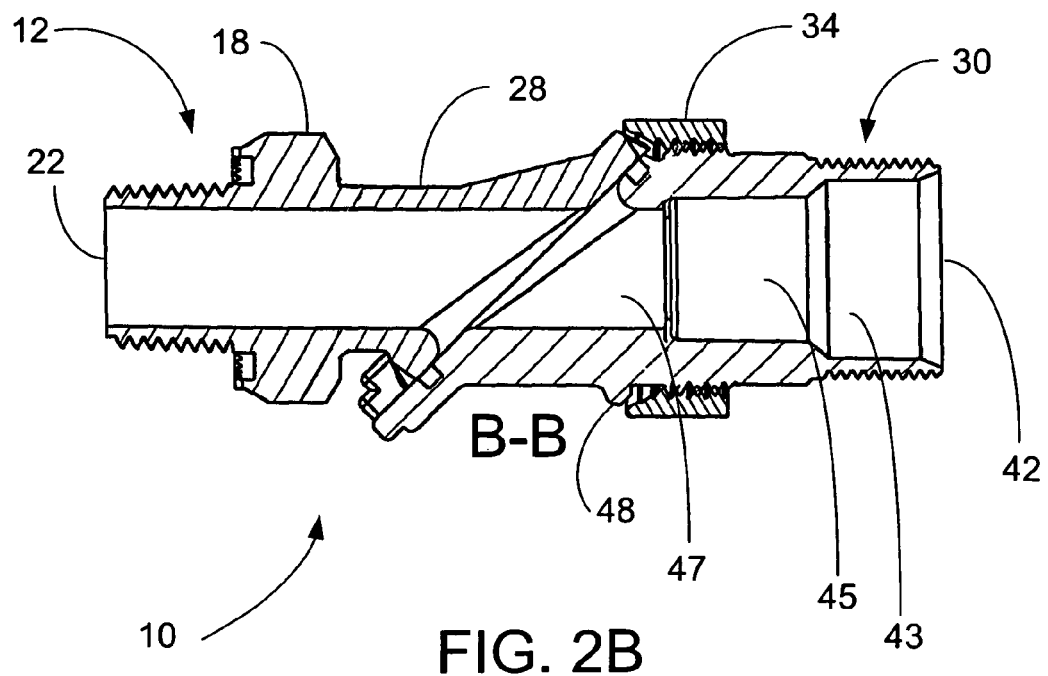

Referring to FIGS. 1A-B and 2A-B, FIGS. 1A-1B show the connector 10 in the unlocked position. The scalloped edge 16 of the flanged end 26 is not engaged by the coupling nut 34 and is, therefore, free to swivel or rotate within the dovetail 32. This swiveling or rotating allows the user to adjust the angular disposition of the body 12 in relation to the hub 30. After the desired angle is achieved, the coupling nut 34 is tightened and engages the scalloped edge 16 of the flanged end 26, which prevents the body 12 from further rotation or swiveling. FIGS. 2A-B show the connector 10 in the locked position with the coupling nut 34 engaging the scalloped edge 16 and preventing movement of the body 12. Loosening the coupling nut 34 allows the user to rotate and readjust the orientation of the body 12.

The coupling nut 34 is designed to overlap one side of the flanged end 26 and force the other side of the flanged end 26 into the dovetail 32. The coupling nut 34 can be completely removed from the body 12, but it only has to be rotated one or two turns to disengage the flanged end 26 from the dovetail 32 and separate the body 12 from the hub 30. Loosening the coupling nut 34 frees the flanged end 26 so that it can be repositioned in the dovetail 32 to adjust the angle of the connector 10. At the same time, the coupling nut 34 retains the flanged end 26 in the dovetail 32 so that the hub 30 does not completely separate from the body 12. FIGS. 1B and 2B show a circular rib 48 on the hub 30, near the coupling nut 34. This rib 48 is for aesthetic purposes and does not form a stop for the nut 34. However, when the connector 10 is oriented in certain positions, the circular rib 48 deflects water away from the nut 34. FIGS. 1B and 2B are cross-sectional views of the hub 30 and show the inner diameter of the hub 30 decreasing in stages from the end 42 where the electrical cable (not shown) is connected to form three separate chambers 43, 45, 47. When an armored cable is used with the connector 10, the first chamber 43 receives the electrical cable, the second chamber 45 receives the portion of the electrical cable that has the outer protective coating removed and the third chamber 47 receives the electrical cable with the outer protective coating and armored layer removed. When an unarmored cable is used with the connector 10, the first chamber 43 and second chamber 45 receives the portion of the electrical cable and the third chamber 47 receives the electrical cable with the outer protective coating removed.

Figure 3A:
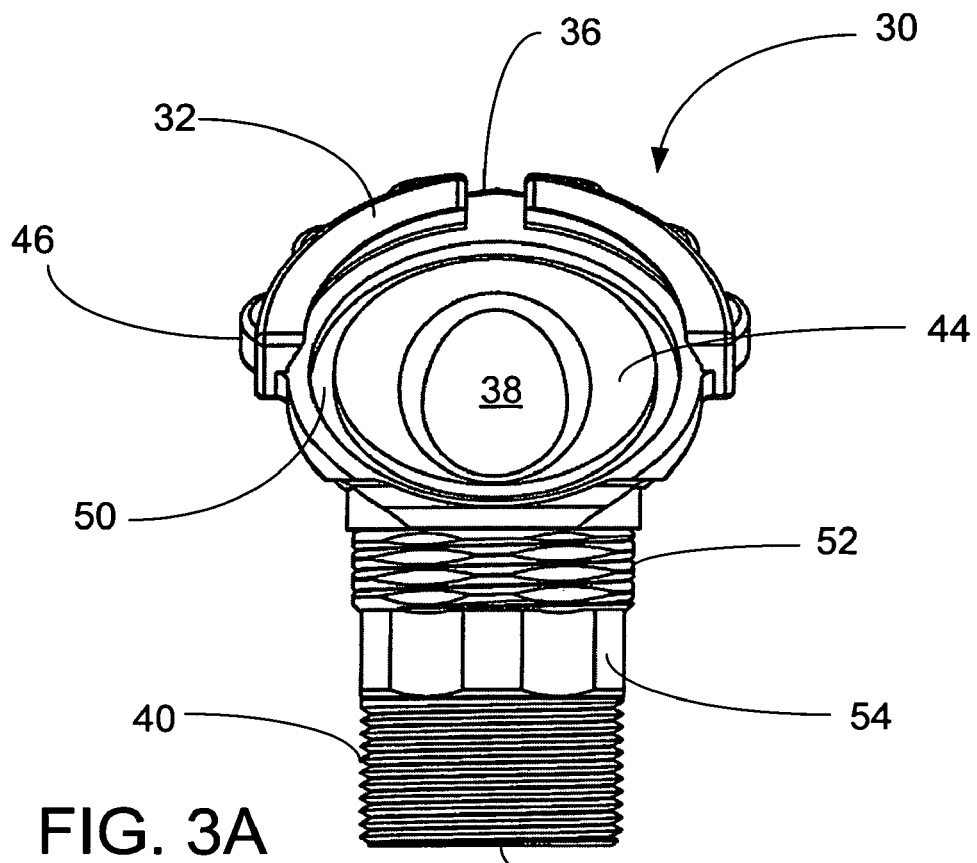
FIG. 3A is a bottom view of an embodiment of the hub component of the adjustable connector of the present invention.
Figure 3B:
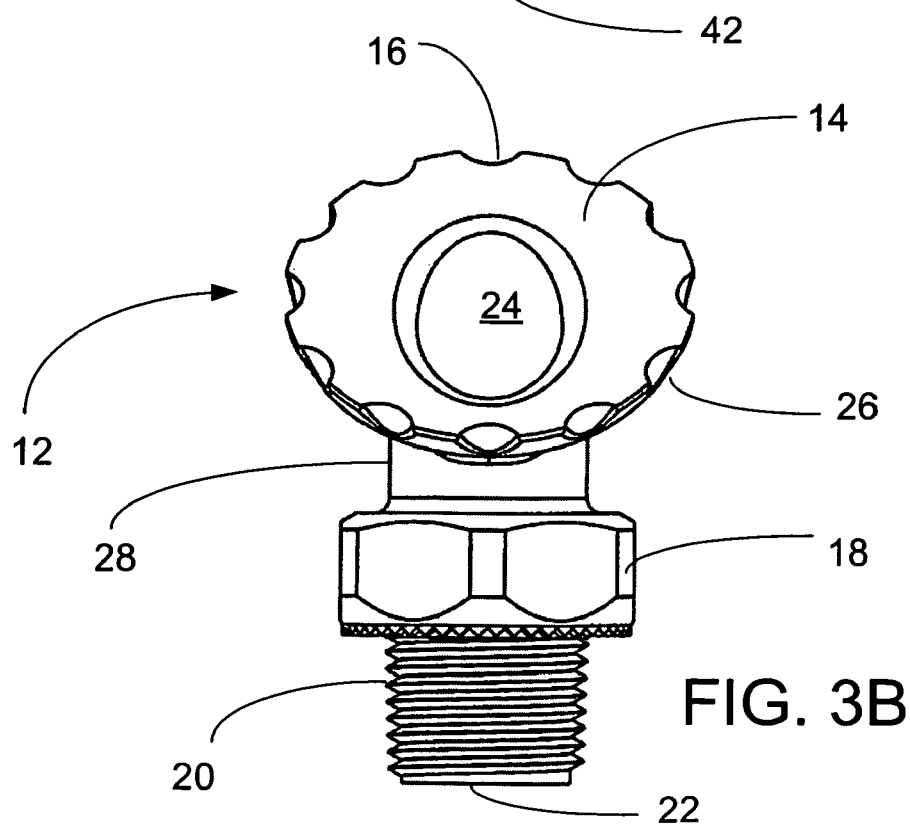
FIG. 3B is a bottom view of an embodiment of the body component of the adjustable connector of the present invention.
Figure 4B:
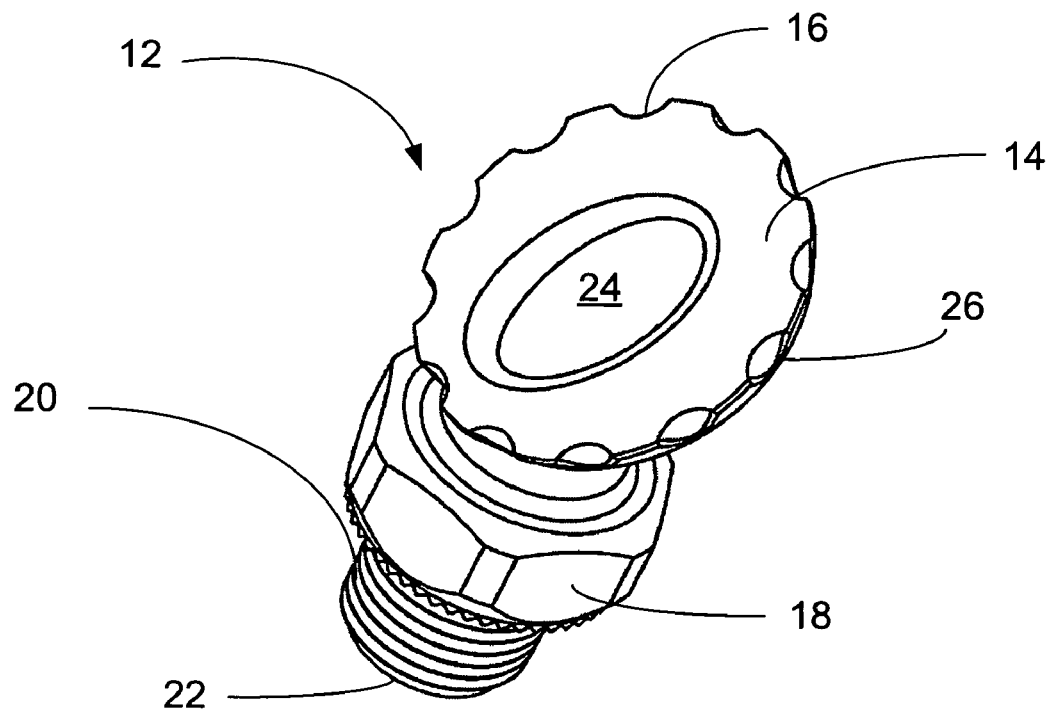
FIG. 4B is a perspective view of an embodiment of the body component of the adjustable connector of the present invention.

FIGS. 3A and 4A show a groove 50 at the flanged end 44 of the hub 30 that contacts the flat surface 14 of the flanged end 26 of the body 12 when the connector 10 is assembled. An O-ring (not shown) can be inserted in this groove 50 so that when the body 12 is connected to the hub 30, the O-ring seals out dust and moisture. While the groove 50 is shown in the flanged end 44, it can also be located in the flat surface 14 of body 12, if desired. FIG. 4B shows the flat surface 14 of the flanged end 26 of the body 12 that is sealed by the O-ring. The threads 20 on the cable connection end 22 can be used to connect the body 12 to a cable or an enclosure.

Figure 5B:
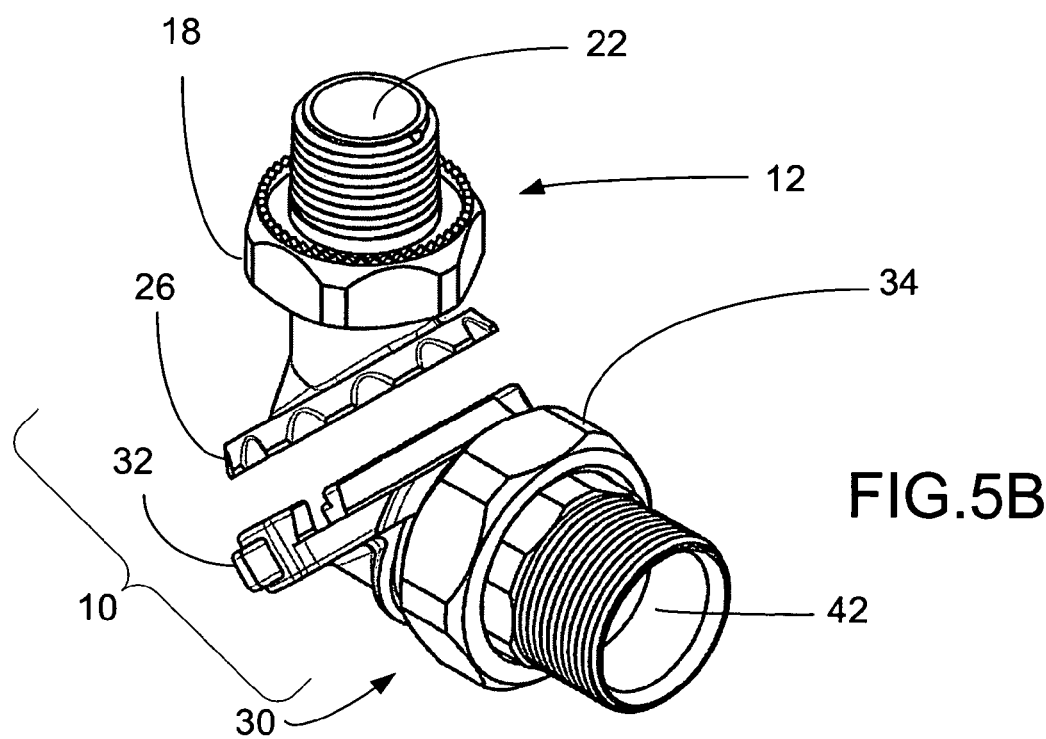
FIG. 5B is a perspective view of an embodiment of the hub and body components of the adjustable connector of the present invention with their axes disposed at a right angle.
Figure 6B:
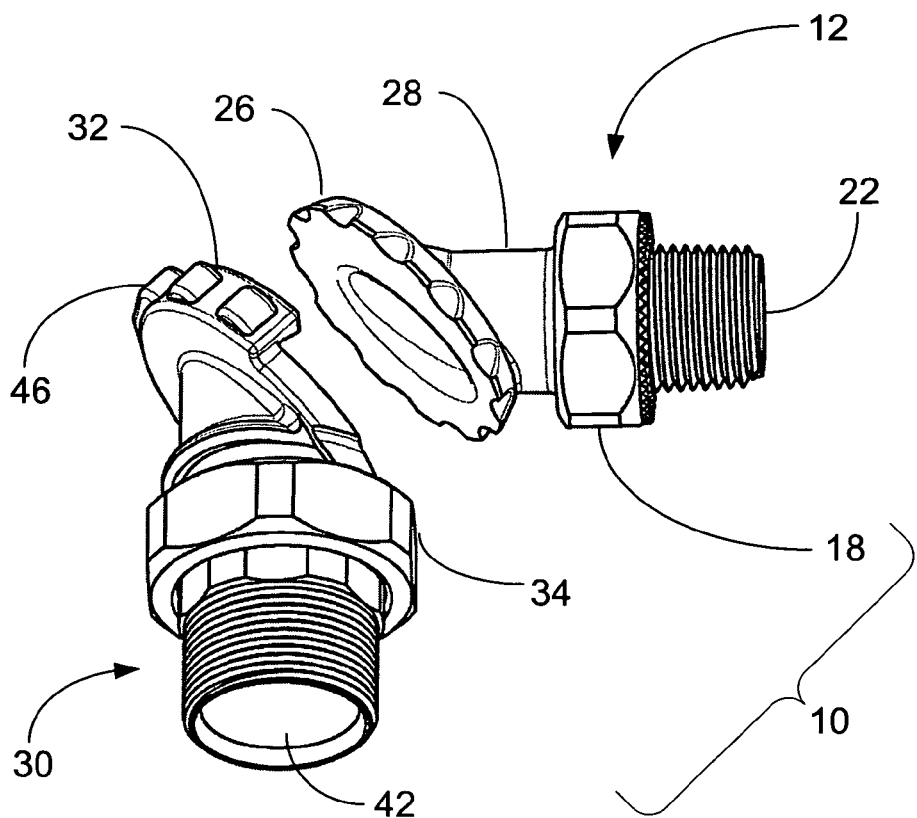
FIG. 6B is a perspective view of an embodiment of the hub and body components of the adjustable connector of the present invention with their axes disposed at a right angle.

FIGS. 5A and 6A show the adjustable connector 10 with the body 12 and the hub 30 oriented so that, when they are joined, they form a "straight through" connector. This configuration is preferred when the cable (not shown) is initially installed in the connector 10. After the cable is pulled through the connector 10, the body 12 and hub 30 can be rotated as shown in FIGS. 5B and 6B to form a 90-degree angle. The coupling nut 34 is then threaded onto the hub 30 and tightened to secure the connector 10 in the desired orientation.

Figure 7A:
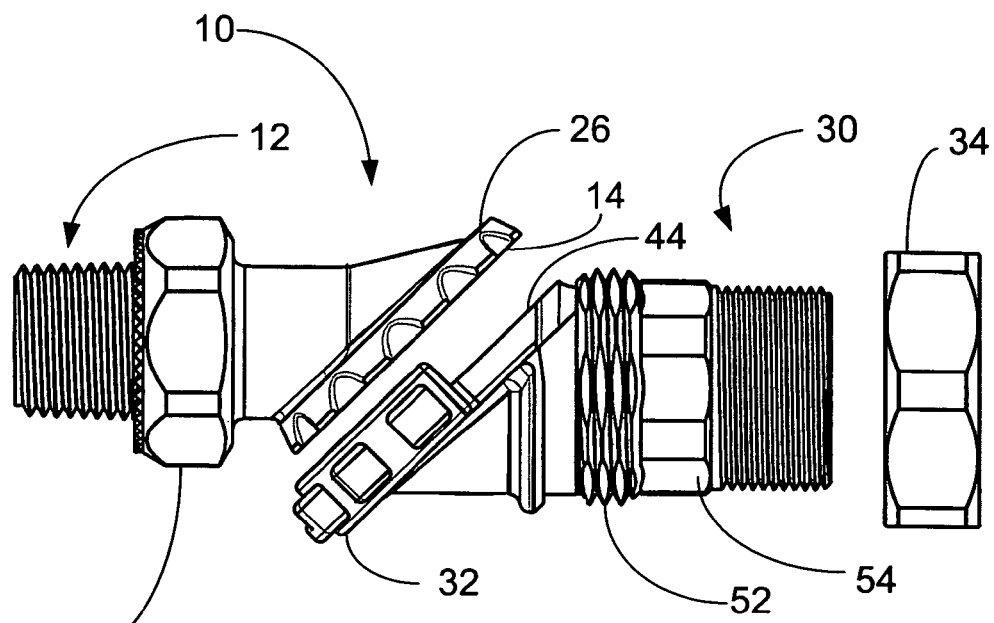
FIG. 7A is a side view of an embodiment of the hub and body components of the adjustable connector of the present invention with their axes in parallel relationship.
Figure 7B:
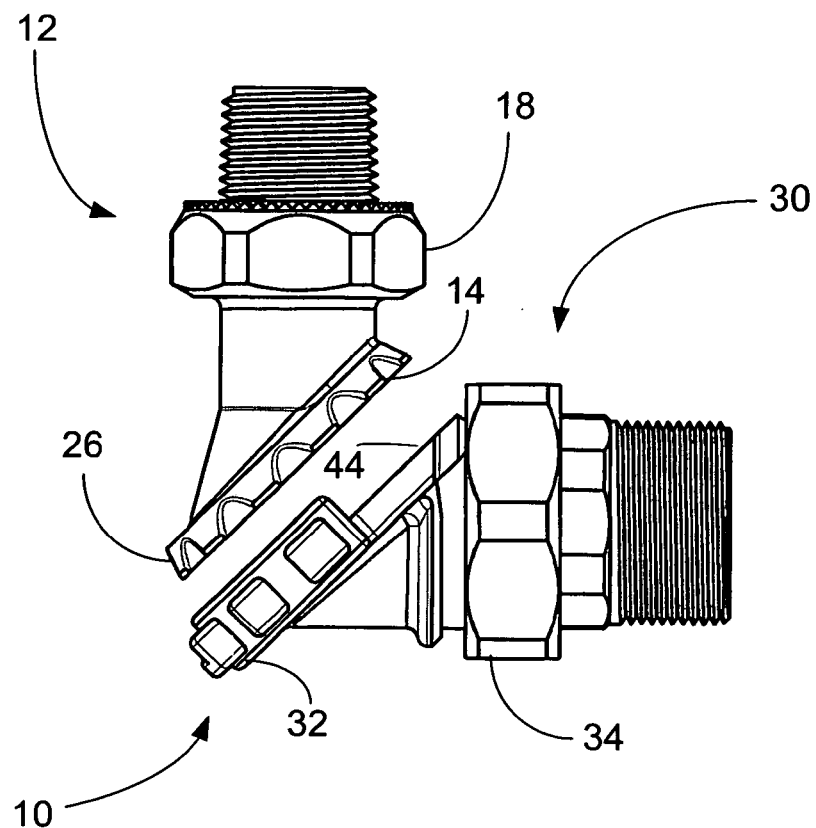
FIG. 7B is a side view of an embodiment of the hub and body components of the adjustable connector of the present invention with their axes disposed at a right angle.

Referring now to FIG. 7A, the threads 52 for the coupling nut 34 in this embodiment are not cut into the surface of a round tube, but instead the threads 52 are cut into the flats 54 in the hub 30. Accordingly, the threads 52 effectively disappear at points that correspond to the mid-point of the flats 54. The flattened threads 52 can also be seen in FIGS. 3A, 4A and 5A. The coupling nut 34 is placed on the hub 30 before the cable (not shown) is installed but the coupling nut 34 is not tightened until the adjustable connector 10 is oriented in the desired position. FIG. 7B shows the connector 10 oriented to provide a 90-degree angle.

Figure 8A:
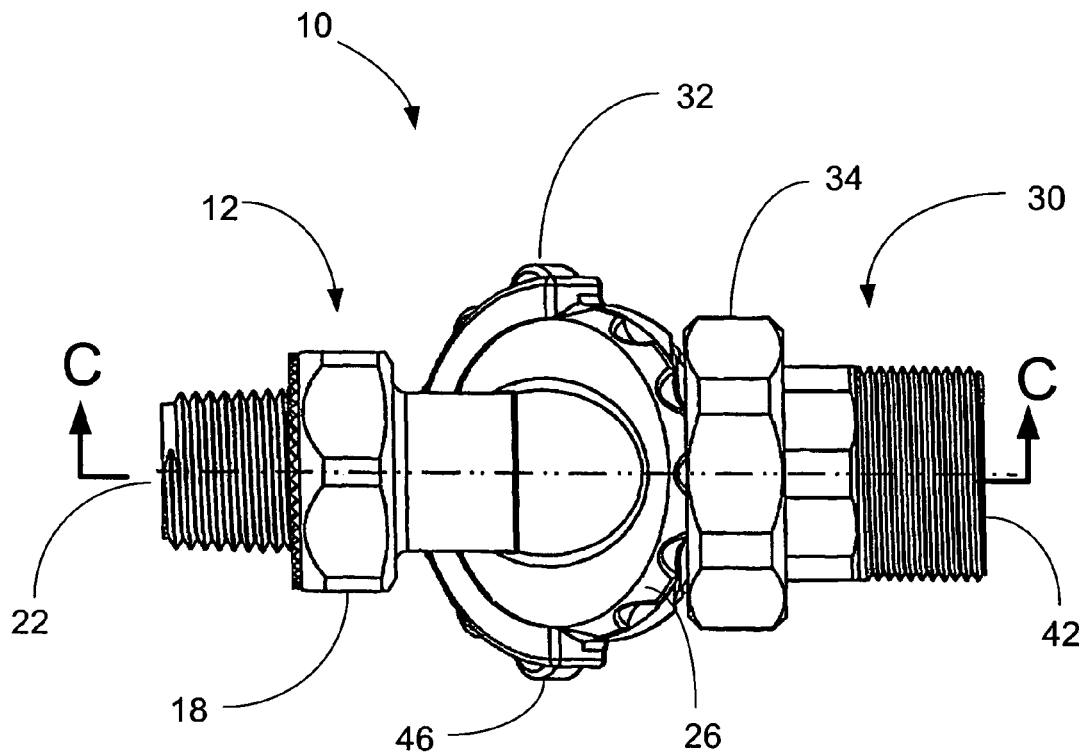
FIGS. 8A-B are a top view and a sectional view of an embodiment of the adjustable connector of the present invention in the unlocked position.
Figure 8B:
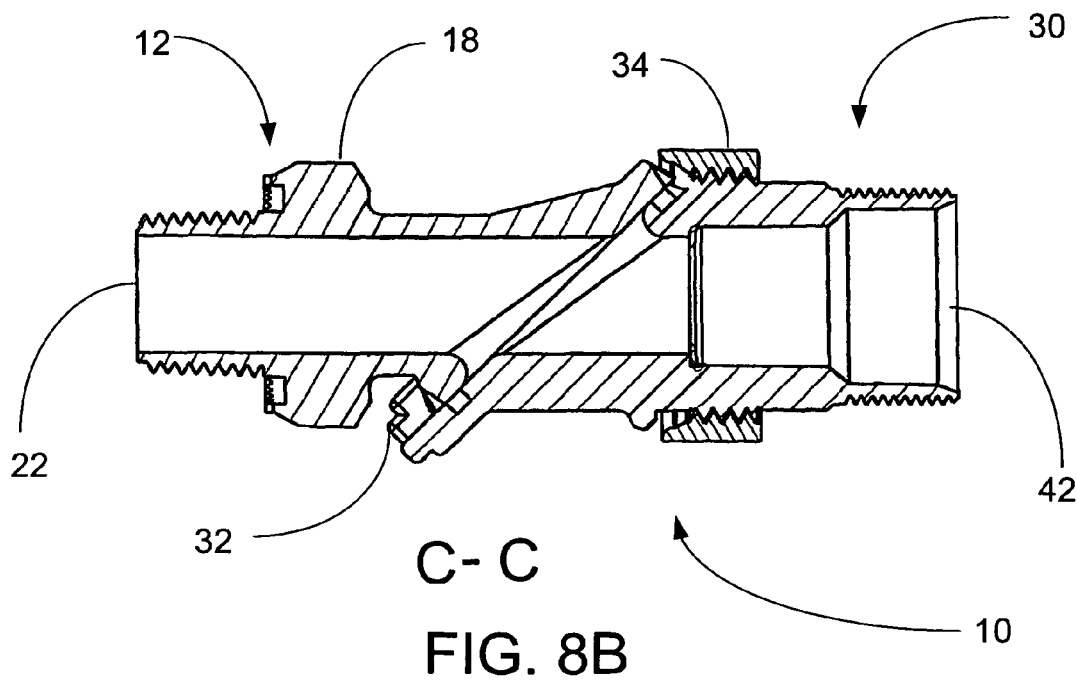

FIGS. 8A and 8B show the adjustable connector 10 in a straight through or 180 degree angle configuration. The apertures in the body 12 and the hub 30 are aligned so that a cable (not shown) enters the cable connector end 42 of the hub 30 (i.e., the end of the hub 30 with the threads 40) and passes straight through to the cable connector end 22 of the body 12.

Figure 9A:
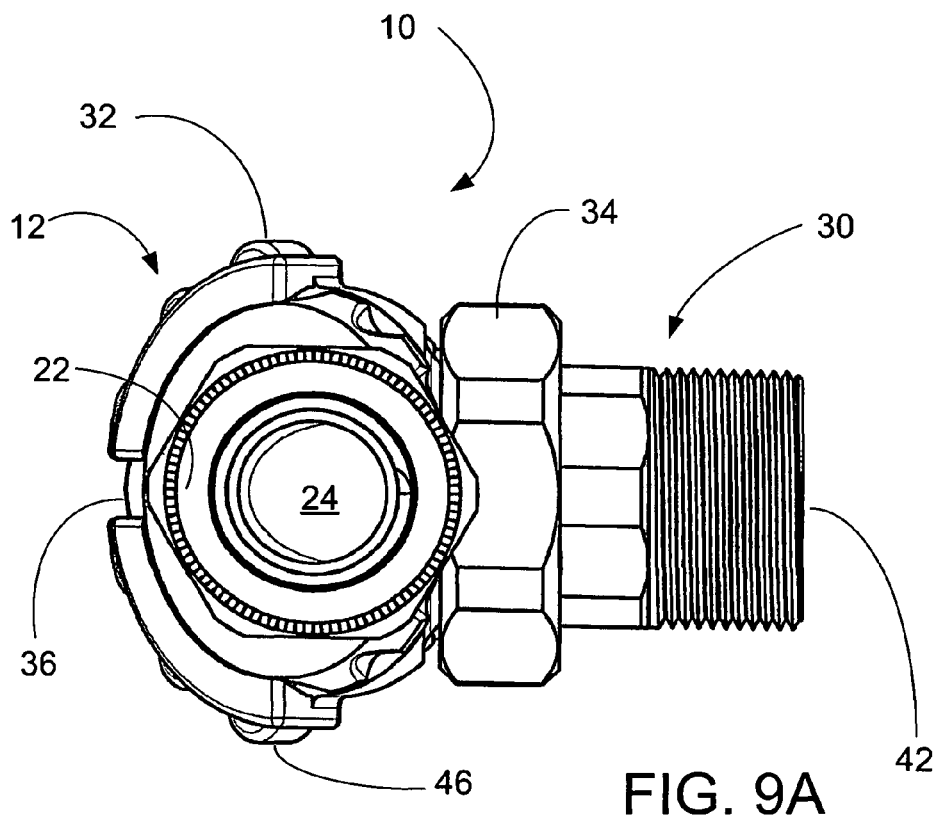
FIG. 9A-B are a top view and a side sectional view of an embodiment of the adjustable connector of the present invention with the body and hub disposed at a right angle.
Figure 9B:
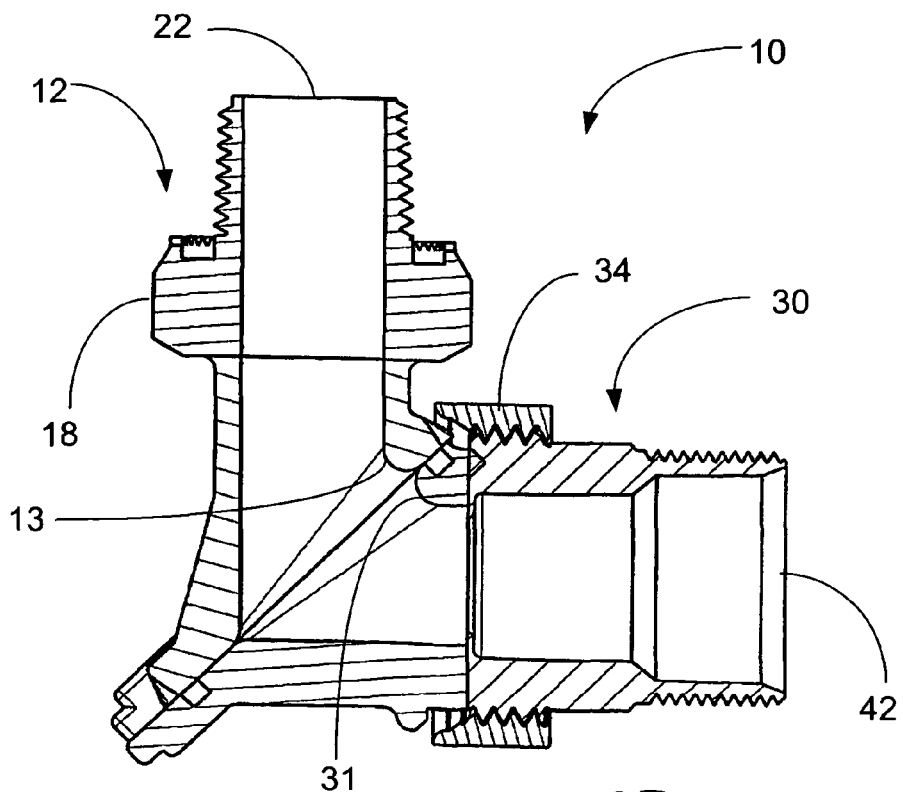

FIGS. 9A and 9B show the adjustable connector 10 oriented so that the axes of the body 12 and the hub 30 form a 90 degree angle. A cable (not shown) entering the cable connector end 42 of the hub 30 bends 90 degrees as it passes through the aperture 24 in the body 12 and exits the cable connector end 22. FIG. 9B shows how the shoulder 31 on the hub 30 and the shoulder 13 on the body 12 are rounded to minimize any damage to the cable.

FIGS. 10A-C and 11A-C show another embodiment of the present invention in which the connector 110 has three components, a body, 112, a hub 130 and in between them a coupler 160. The finger grips 146, 170 shown on the exterior surface of the dovetails 132, 162 in FIGS. 10A-C are raised members or ribs, which are different from the finger grips 46 shown in FIGS. 1A-9B, but they can be the same. The connectors 110, 210, 310 shown in FIGS. 10A-13B are for larger diameter cables that do not bend easily and, hence, have a greater bend radius, which require connectors 110, 210, 310, with larger bend radii. Referring to FIGS. 10A-C and 11A-C, the body 112 has a hex fitting 118, a neck 128 and a flanged end 126 with a scalloped edge 116. The coupler 160 has a dovetail 162 on one end, a coupling nut 164 a neck 166 and a flanged end 168 with a scalloped edge 172, which connects to the hub 130. The hub 130 has a dovetail 132 with hand grips 146 and a lock nut 134 for engaging the flanged end 168 of the coupling 160.

FIGS. 10A-C show an adjustable connector 110 configured so that the aperture 111 through the connector 110 is substantially straight. When a cable (not shown) is inserted into the connector 110, it easily passes through until the connector 110 reaches the desired location along the cable run. The connector 110 can then be oriented to provide the desired bend angle before the coupling nuts 134, 164 are tightened to lock the connector 110 in place. FIGS. 11A-C show how the components (i.e., the body 112, coupler 160 and hub 130) of the connector 110 are reconfigured by rotating the coupler 160 and the hub 130 to form a 90-degree bend. After the connector 110 is configured for a 90-degree bend, or any other desired angle, the coupling nuts 134, 164 are tightened to secure the flanged ends 126, 168 at a fixed position. When the connector 110 in FIG. 11B is compared to the connector 10 in FIG. 9B, it is readily apparent that the coupler 160 provides a larger bend radius for the cable (not shown) inside the connector 110.

Figures 12A, 12B, 12C:
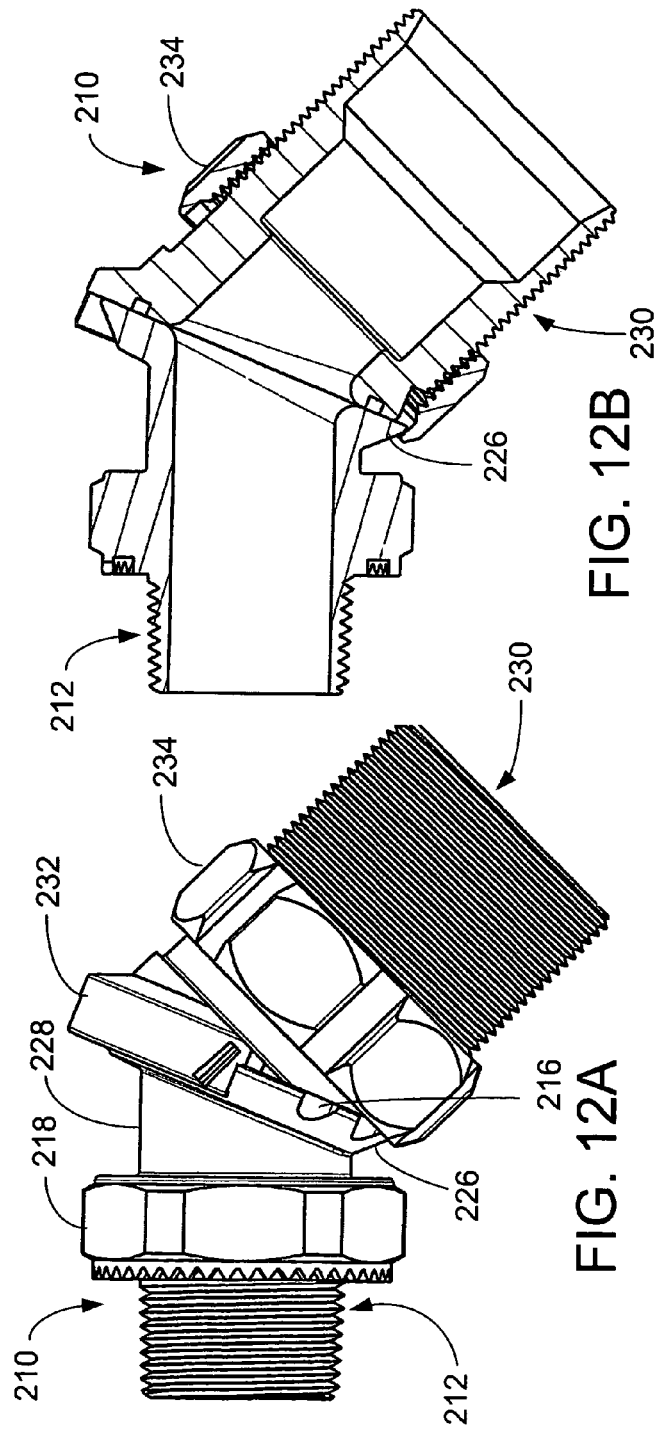
FIGS. 12A-C are a side view, a sectional view and a bottom view of an embodiment of the adjustable connector of the present invention that includes body, hub and coupler components forming a 45-degree bend.

FIGS. 12A-C show a connector 210 used for larger cables, which is a larger version of the connector in FIGS. 1A-9B. The connector 210 has the same principal of operation, wherein the flanged end 226 of the body 212 rotates in the dovetail 232 of the hub 230 until a desired orientation is achieved. The connector 210 is then maintained at that angle by tightening the coupling nut 234. The connector 210 includes a body 212 that has a hex fitting 218, a neck 228 and a flanged end 226 with a scalloped edge 216, and a hub 230 that has a dovetail 232 and coupling nut 234.

Figures 13A, 13B:
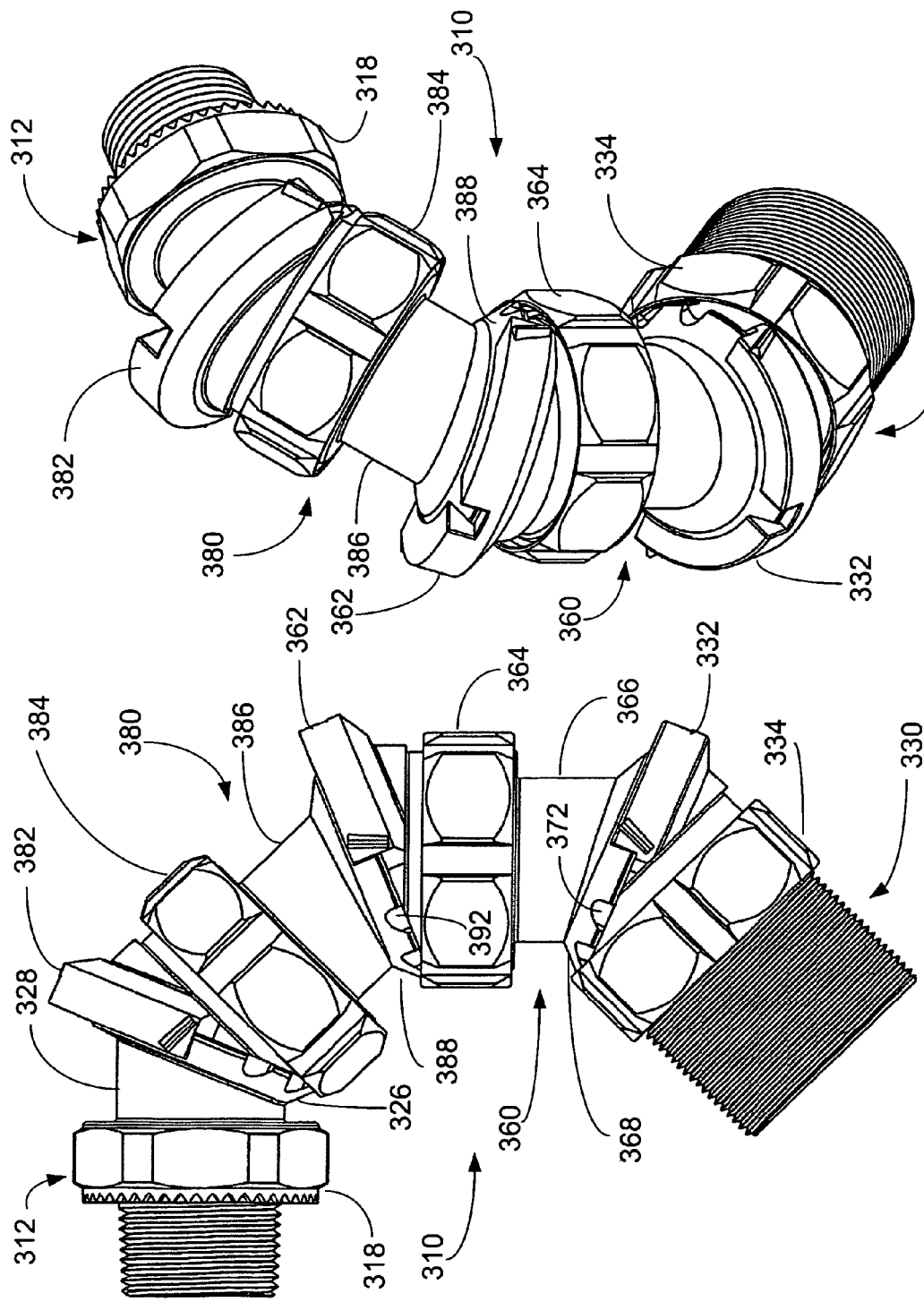
FIGS. 13A-B are a side view and a perspective view of an embodiment of the adjustable connector of the present invention that includes body, hub and two coupler components forming a 135-degree bend.

FIGS. 13A-B show another embodiment of the present invention, wherein the connector 310 has four components, a body 312 and a hub 330 and two couplers 360, 380 disposed between them. This embodiment is similar to the embodiment shown in FIGS. 10A-C and 11A-C except a second coupler 380 is included. The second coupler 380 provides greater flexibility so that the connector 310 can have additional configurations. Moreover, the second coupler 380 also provides a larger bend radius which is needed for large diameter cables. The body 312 has a hex fitting 318, a neck 328 and a flanged end 326 and the hub 330 that has a dovetail 332 and coupling nut 334. The first coupler 360 has a dovetail 362 on one end, a coupling nut 364 a neck 366 and a flanged end 368 with a scalloped edge 372, which connects to the hub 330. The second coupler 380 has a dovetail 382 on one end that connects to the flanged end 326 of the body 312, a coupling nut 384, a neck 386 and a flanged end 388 with a scalloped edge 392, which connects to the dovetail 362 of the first coupler 360. Although FIGS. 13A-B show a connector 310 with two couplers 360, 380, the invention is not limited to two couplers 360, 380 and additional couplers can be added.

Figure 14A:
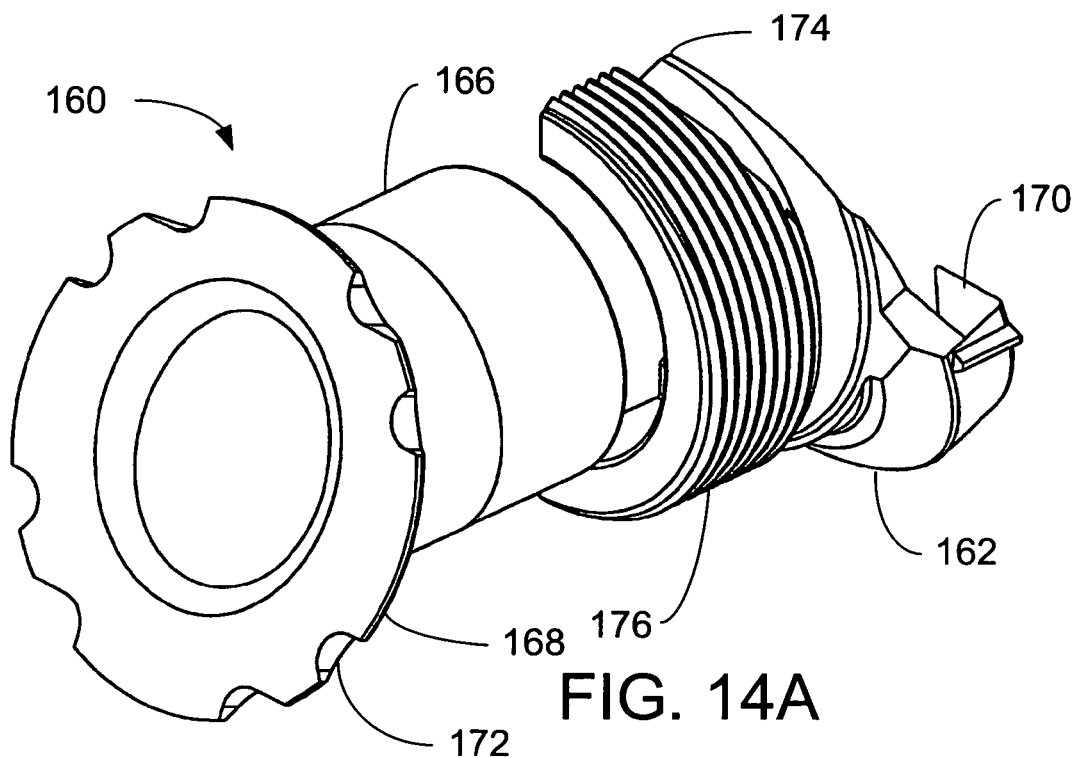
FIGS. 14A-B are detail views of the coupler component shown in FIGS. 10A-11B.
Figure 14B:
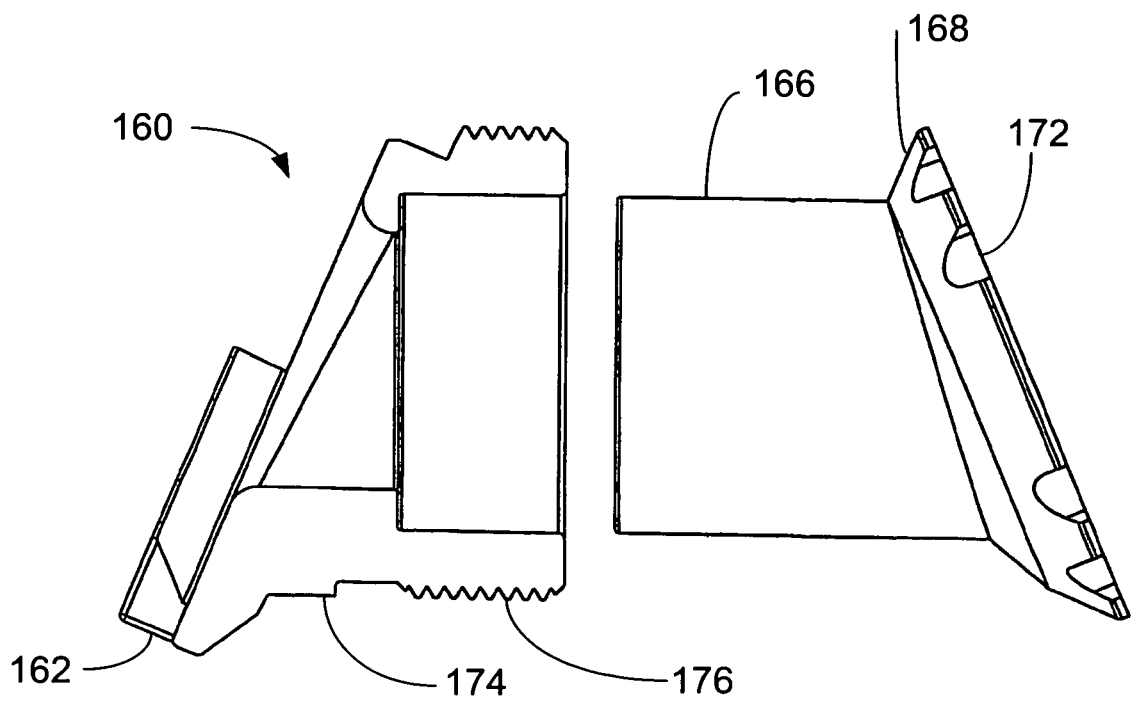

FIGS. 14-A-B show a detail of the coupler 160 that is used in the connector 110 shown in FIGS. 10A-C and 11A-C. The coupler 160 in FIG. 14A-B is substantially the same as the couplers 360, 380 shown in FIGS. 13A-B. The coupler 160 has two sections, a stem 166 and a base 174, wherein the first end of the stem 166 is slidably received by the first end of the base 174. The second end of the stem 166 is a flanged end 168 with a scalloped edge 172, which is disposed at an angle to the axis of the stem 166. The second end of the base 174 has a dovetail 162. After the coupling nut 164 (FIGS. 11A-C) is placed over the stem 166, the stem 166 is inserted into the base 174 and can be set in a fixed orientation by tightening the coupling nut 164 onto the threaded end 176 of the base 174 so that the flanged end 168 of the stem 166 and the dovetail 162 of the base 174 are in a fixed relationship. However, in another embodiment, after the stem 166 is inserted into the base 174, the stem 166 is not set in a fixed position and is left to freely rotate over 360-degrees so that the angularly disposed flanged end 168 can connect to another component of the connector 110 at a variety of angles. Once the coupler 160 is set to the desired orientation, the stem 166 is locked into position by tightening the coupling nut 164 so that it can no longer rotate.

Referring now to the scalloped edges or scallops 16 on the flanged end 26 of the body 12 (FIG. 4B) and the scallops 172 on the flanged end 168 of the coupler 160 (FIG. 14B), while these scallops 16, 172 may serve as finger grips to help rotate the body 12 or the coupler 160, they also have a wholly separate purpose which can be better explained by referring to the line drawings shown in FIGS. 15-17. These scallops are located for select pre-set angles such as 22.5, 45, 90 and/or 180 (or zero) degrees. Not all angles need be accommodated on a single connector and a connector can be manufactured with the position of these scallops 16, 172 moved or changed so as to accommodate other pre-set degrees desired by the user.

Figure 15A:
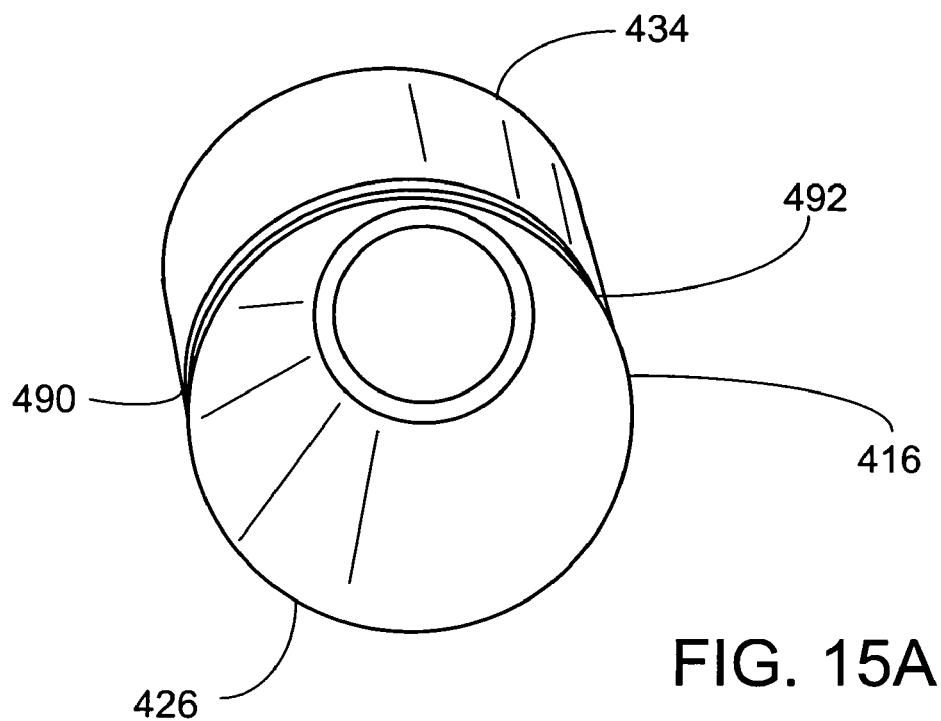
FIGS. 15A-B are perspective views illustrating the relationship between a flanged end and a coupling of an embodiment of the connector of the present invention.
Figure 15B:
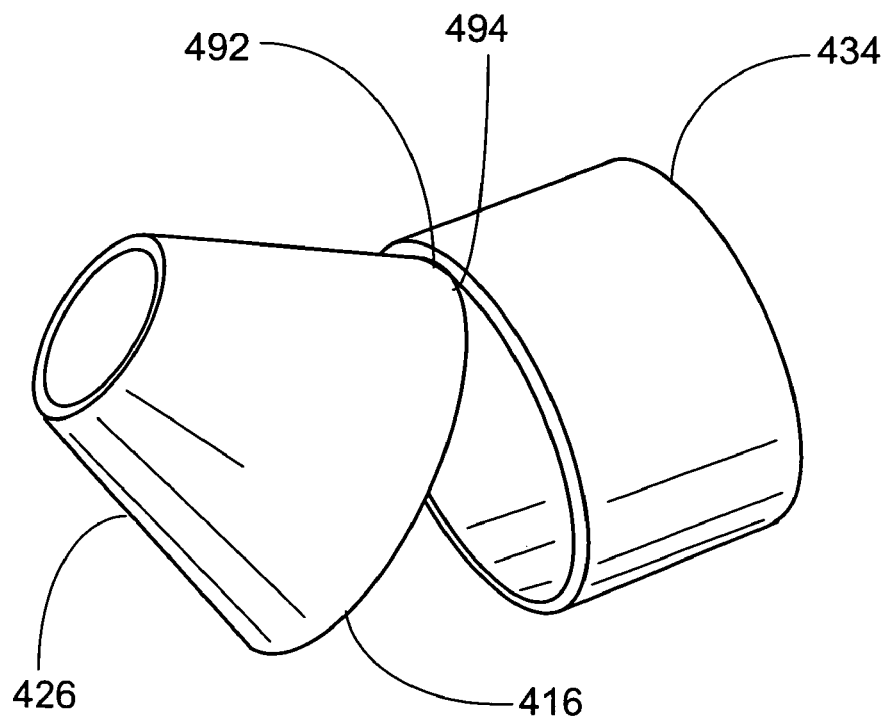

FIGS. 15A-17B illustrate the rotating/swivel operation of the connectors of the present invention. FIGS. 15A-B show a coupling nut represented by a cylinder 434 and a flanged end represented by a conical section 426, wherein the flanged end/conical section 426 is unlocked from the coupling nut/cylinder 434, but still held in place by the coupling nut/cylinder 434. The edge 416 (the scalloped portion is not shown) of the flanged end/conical section 426 is represented by the larger end of the flanged end/conical section 426. In the unlocked position shown in FIGS. 15A-B, contact is made between the edge 416 of the flanged end/conical section 426 and the coupling nut/cylinder 434 at two points 490, 492 (FIG. 15A) and a small portion 494 of the edge 416 extends inside the coupling nut/cylinder 434 (FIG. 15B). The two points 490, 492 of contact between the edge 416 and the coupling nut 434 are separated by a sufficient distance to permit the coupling nut/cylinder 434 and the flanged end/conical section 426 to independently rotate.

Figure 16A:
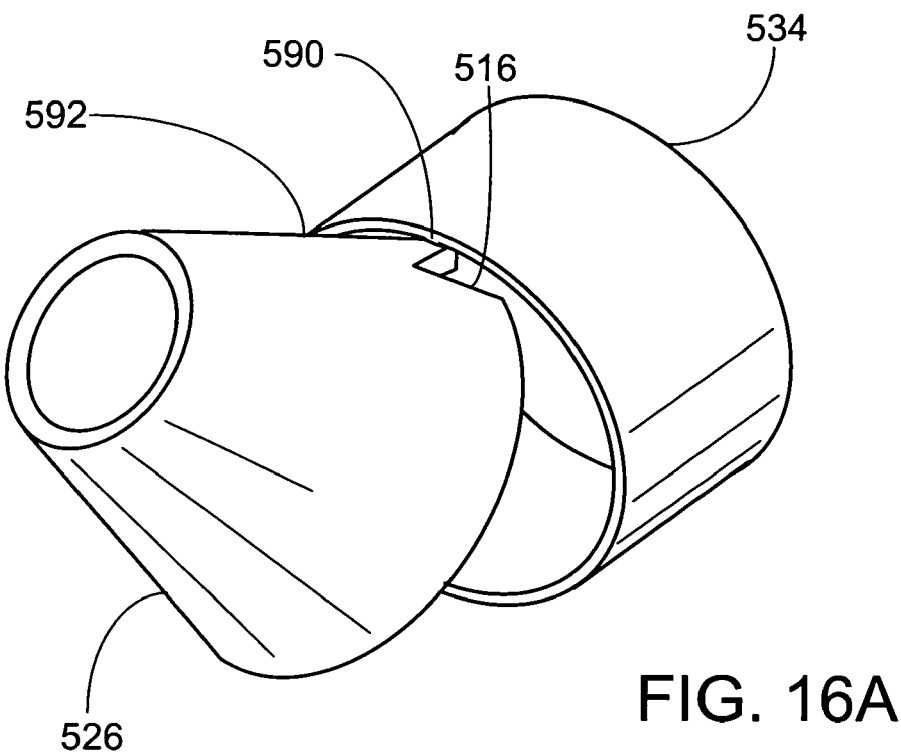
FIGS. 16A-B are perspective views illustrating the relationship between a flanged end and a coupling of an embodiment of the connector of the present invention.
Figure 16B:
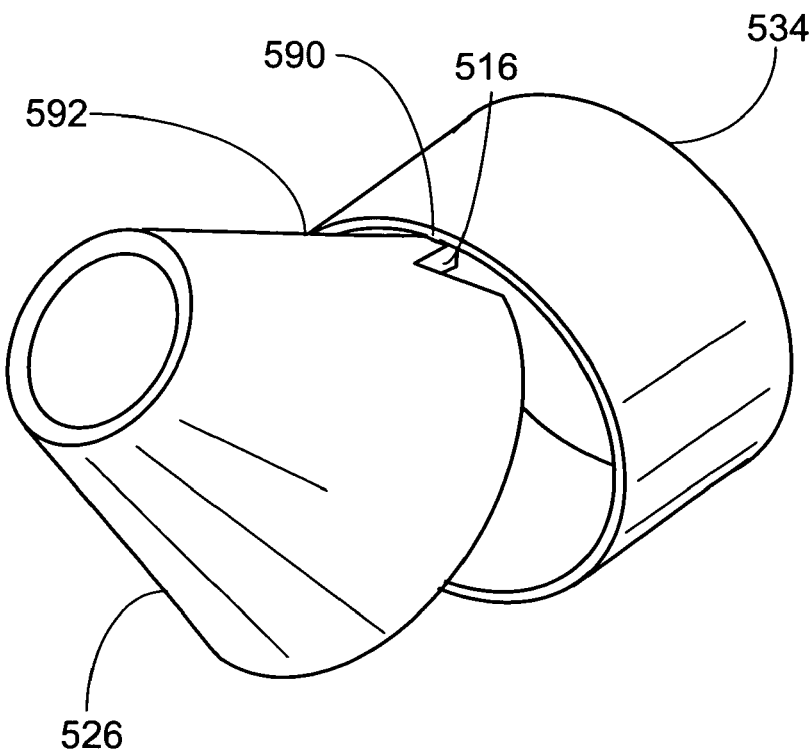

FIGS. 16A-B illustrates the operation of the scalloped edge 516 of the flanged end/conical section 526 and the coupling nut/cylinder 534. As the coupling nut/cylinder 534 is tightened, it moves closer to, or encroaches more upon, the flanged end/conical section 526. FIGS. 16A-B show only a single indentation for the scalloped edge 516, but it is only representative and it is understood that the scalloped edge 516 consists of a plurality of indentations. Accordingly, as the coupling nut/cylinder 534 is rotated and tightened, it "rides up" the flanged end 526 (illustrated in FIGS. 16A-B as the larger end of the conical section) and begins to engage the indentations of the scalloped edge 516 at one or more points 590, 592. The second point 592 is on the far side of the conical section and, therefore, not clearly visible in FIGS. 16A-B. The coupling nut/cylinder 534 extends further over the flanged end/conical section 526 as it is tightened and, consequently, the separation between the two contact points 590, 592 decreases. FIGS. 16A-B show that the coupling nut/cylinder 534 contacts only at point 590 on one side of the scallop and that the opposite side is not yet engaged by the coupling nut/cylinder 534.

Figure 17A:
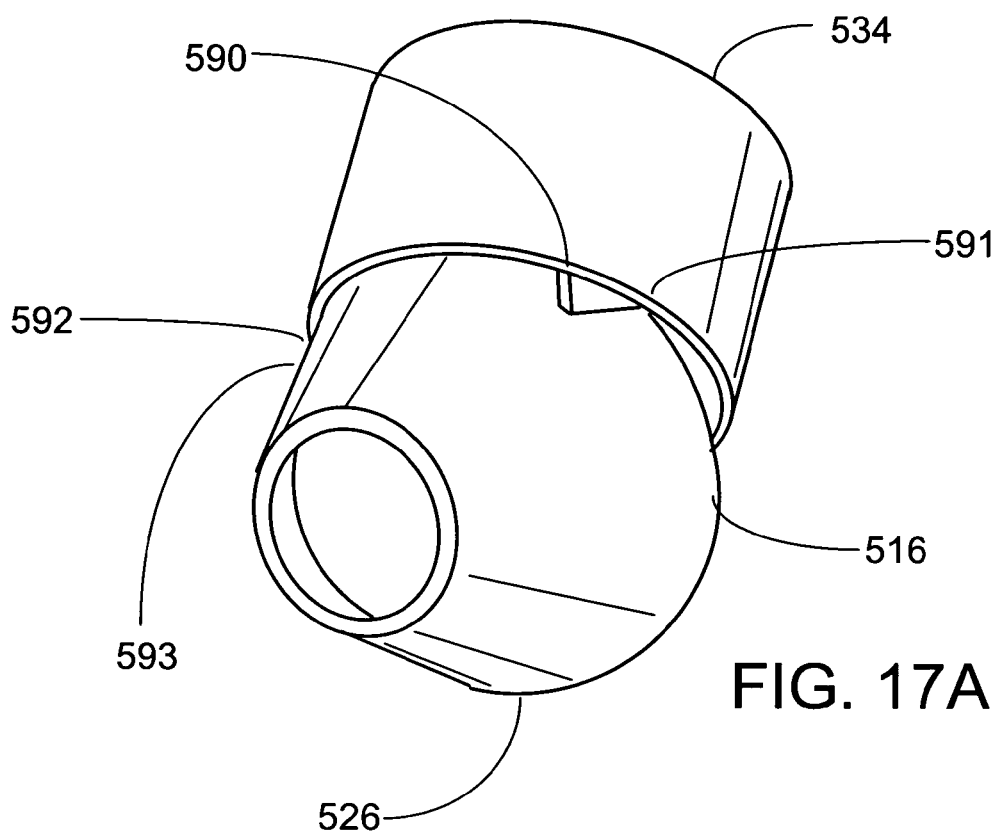
FIGS. 17A-B are perspective views illustrating the relationship between a flanged end and a coupling of an embodiment of the connector of the present invention.
Figure 17B:
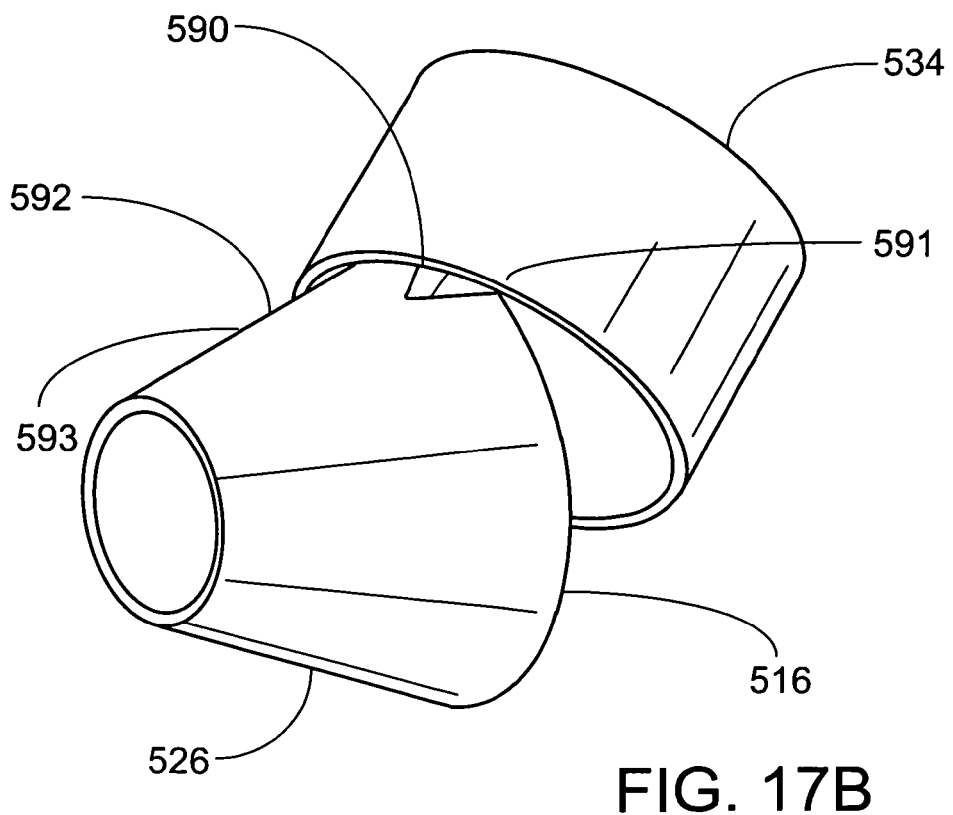

FIGS. 17A-B shows the coupling nut/cylinder 534 in the fully locked position with the angular relationship between the coupling nut/cylinder 534 and the flanged end/conical section 526 in a fixed position. The coupling nut 534/cylinder continues to "ride up" the larger end of the conical section that represents the flanged end/conical section 526 further than shown in FIGS. 16A-B and contacts the indentation in the scalloped edge 516 at two points 590, 591 (i.e., the opposite sides of the same indentation). The second point 591 of contact abuts or "digs into" the edge of the coupling nut/cylinder 534 and provides significant frictional force that increases as the coupling nut/cylinder 534 is tightened. These frictional or biasing forces and the scallop edge 516 (i.e., indentations engaged by the coupling nut/cylinder 534) on both sides of the centerline of the flanged end 526 prevent the flanged end/conical section 526 from any further rotation with respect to the coupling nut/cylinder 534. The flanged end/conical section 526 cannot rotate because a portion of the flanged end 526 extends underneath the coupling nut/cylinder 534. Accordingly, the contact points 590, 591, 592, 593 on the sides of the indentations of the scalloped edge 516 lock the flanged end/conical section 526 in place and prevent it from any further movement.

The indentations on the scallop edge 516 can be configured for engagement by the coupling nut/cylinder 534 at pre-set angles. If the flanged end/conical section 526 is positioned at any angle other than the configured angle (e.g., 30 degrees instead of 45 degrees), the flanged end/conical section 526 does not completely engage or dig-into the coupling nut/cylinder 534 and the relationship between the flanged end/conical section 526 and the coupling nut/cylinder 534 is more like that shown in FIGS. 16A-B (or even FIGS. 15A-B). The flanged end/conical section 526 is engaged by the coupling nut/cylinder 534, but it's not locked in place since the flanged end/conical section 526 is only held in place by friction and the indentations on the scallop edge 516 are not engaged. The position of the coupling nut/cylinder 534 in FIGS. 15A-16B does not physically restrain the flanged end/conical section 526 from further movement, as is the case when the coupling nut is fully tightened as shown in FIGS. 17A-B.

Figure 18A:
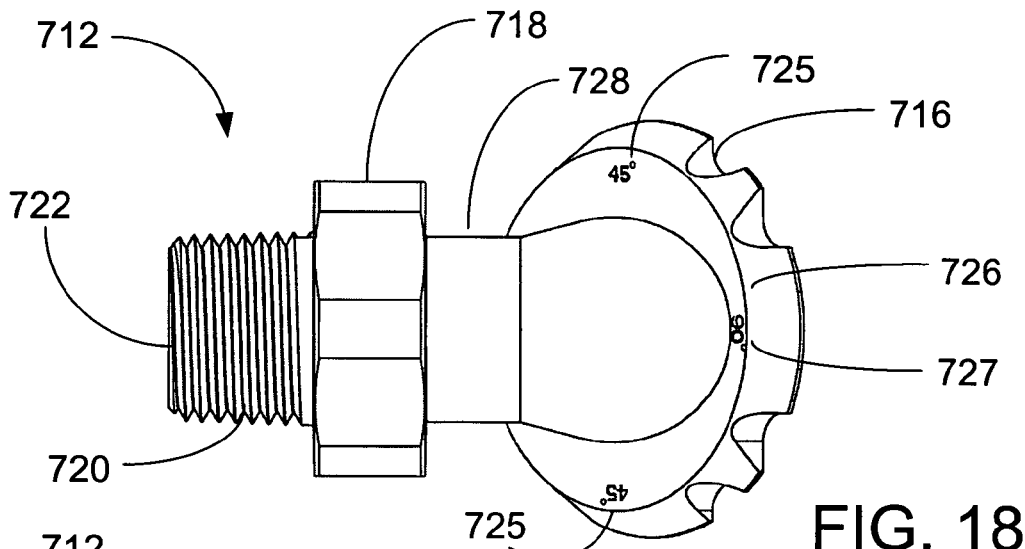
FIGS. 18A-C are top, side and perspective views of an embodiment of the body section of the adjustable connector with indicia on the top surface of the flange.
Figure 18B:
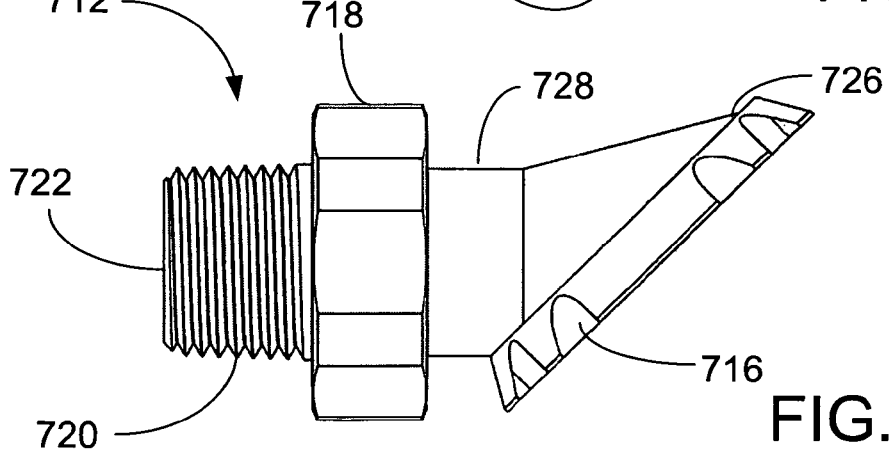
Figure 18C:
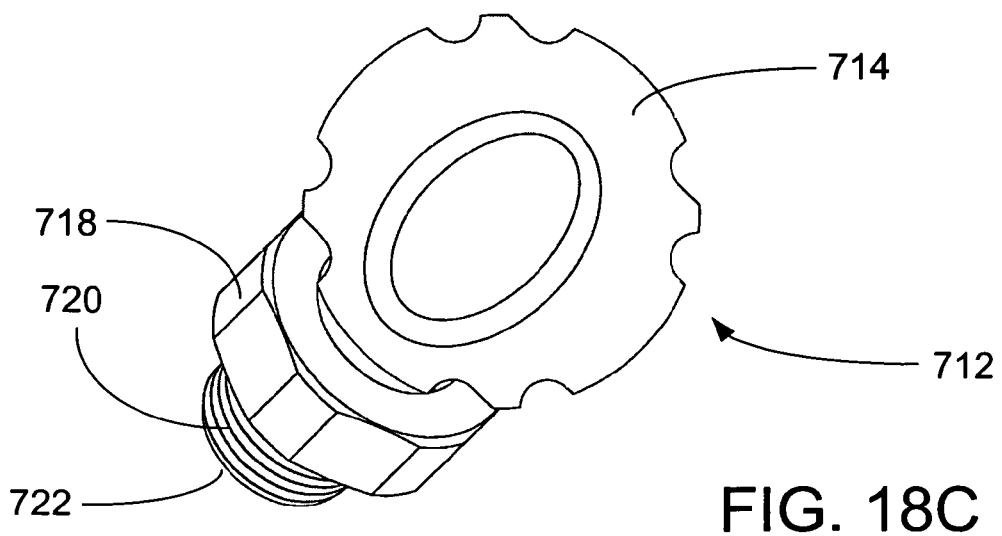

FIGS. 18A-C show an embodiment of the body 712 of the adjustable connector 710 with a cable connector end 722 and a flanged end 726 connected by a neck 728 with a hexed fitting 718. The connector end 722 has threads 720 for connecting the body 712 to a cable or enclosure (not shown) and the flanged end 726 has a plurality of scallops 716 along the perimetrical edge and a substantially flat face 714. In addition, the top surface of the flanged end 726 has indicia 725, 727 which provide visual verification for the user that the body 712 is oriented at designated angles with respect to the either a hub or a coupler (not shown).

Figure 19A:
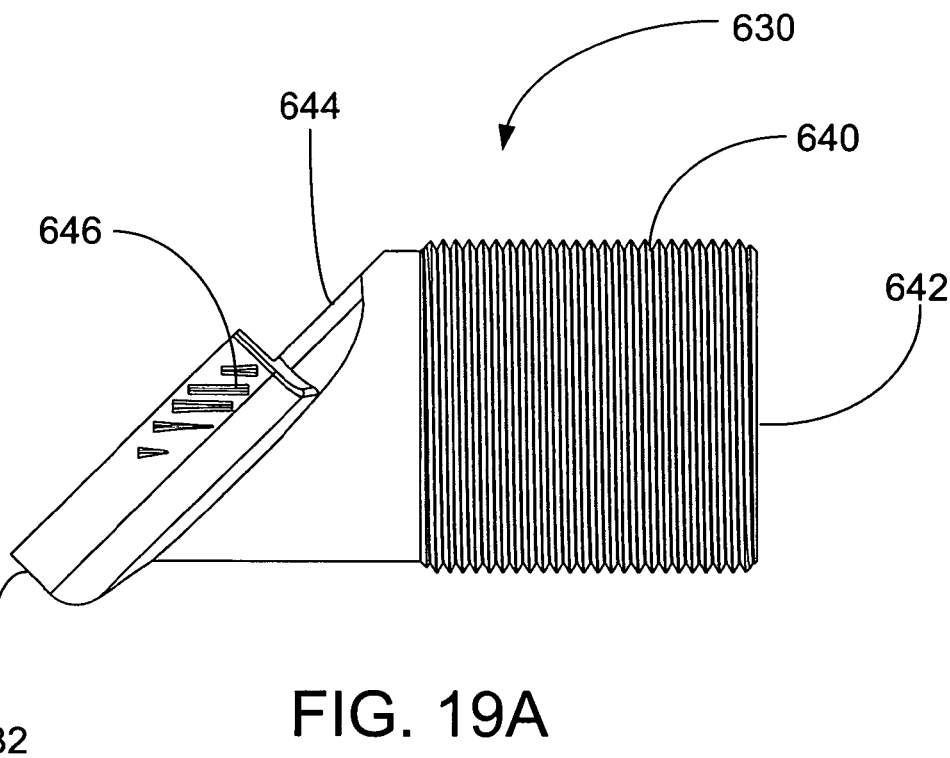
FIGS. 19A-B are side and perspective views of an embodiment of the hub section of the adjustable connector with finger grips on the dovetail.
Figure 19B:
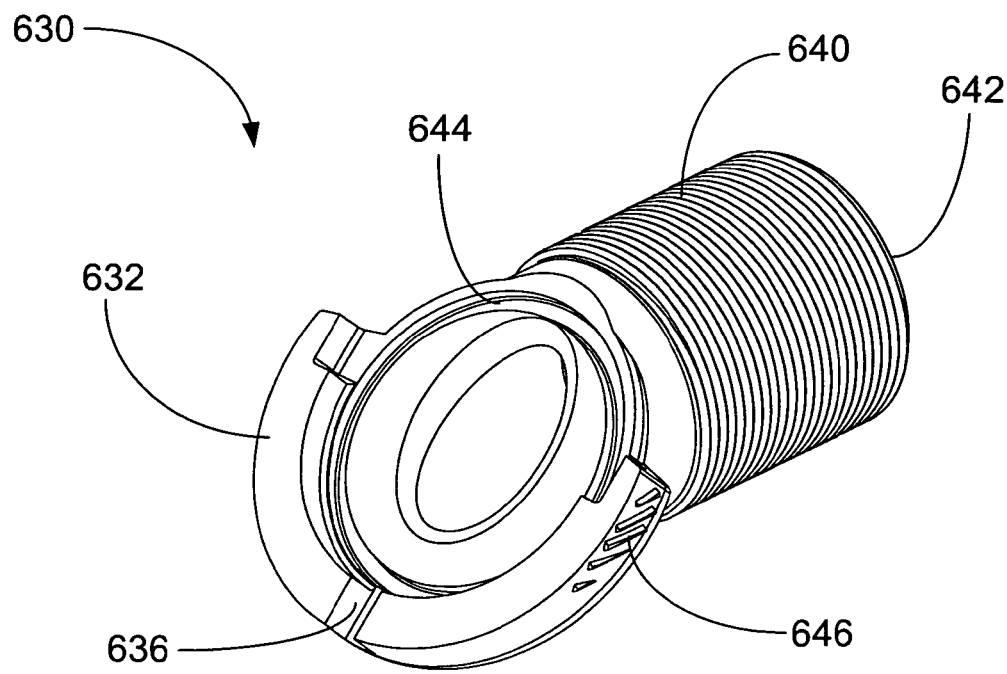

FIGS. 19A-B show an embodiment of the hub 630 having a cable connector end 642 with threads 640 on the exterior surface and a flanged end 644 with a dovetail 632 extending along a portion of the perimetrical edge. The dovetail 632 has a notch 636 near its middle which allows the user to view the edge of a flange (not shown) inserted into the dovetail 632. The dovetail 632 also has a plurality of raised members (or ribs) 646 extending from its radial surface. These raised members 646 are used as finger grips and facilitate rotation of the mating flange (not shown) into the dovetail 632.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. An adjustable connector for electrical cables, the adjustable connector comprising:

a body having a longitudinal axis, opposing ends and an aperture extending therebetween, wherein one end is flanged with a scalloped edge and a substantially flat face that is angularly disposed to the longitudinal axis and the other end is a cable connecting end;

a hub having a central axis, first and second ends and an opening extending therebetween, wherein the first end has a mating surface that is angularly disposed to the central axis and the mating surface has a perimetrical edge and a dovetail extending around about one half of the perimetrical edge; and a coupling nut, wherein the scalloped edge of the flanged end is slidably received in the dovetail and the coupling nut is threaded onto the hub to secure the flanged end in the dovetail.

2. The adjustable connector according to claim 1, wherein the flanged end of the body is angularly disposed to the longitudinal axis at an angle of about 45 degrees and the first end of the hub is angularly disposed to the central axis at an angle of about 45 degrees.

3. The adjustable connector according to claim 2, wherein the body is connected to the hub and the longitudinal axis is substantially parallel to the central axis or the longitudinal axis is disposed with respect to the central axis at an angle of about 45 degrees, about 90 degrees or about 135 degrees.

4. The adjustable connector according to claim 1, wherein the flanged end of the body is angularly disposed to the longitudinal axis at an angle of from about 30 to 60 degrees and the first end of the hub is angularly disposed to the central axis at an angle of from about 30 to 60 degrees.

5. The adjustable connector according to claim 1, wherein the hub further comprises an exterior surface and wherein the exterior surface adjacent the first end is threaded and adapted to receive the coupling nut.

6. The adjustable connector according to claim 1, wherein the flanged end has indicia of the angular disposition of the adjustable connector and the dovetail has a notch, and wherein the indicia is viewable through the notch when the flanged end is secured in the dovetail.

7. The adjustable connector according to claim 1, wherein the cable connecting end of the body is threaded and the second end of the hub is threaded and adapted to receive a cable.

8. The adjustable connector according to claim 1, wherein the coupling nut contacts the flanged end at a point opposite the dovetail.

9. An adjustable connector for electrical cables, the adjustable connector comprising:

a body having a longitudinal axis and comprising a first cable connector end and a first mating end and an aperture extending therebetween, wherein the first mating end has a flange with a face and a scalloped edge and wherein the face of the flange is angularly disposed to the longitudinal axis at an angle of from 30 to 60 degrees;

a hub having a central axis and comprising a second cable connector end and a second mating end and an opening extending therebetween, wherein the second mating end has a flange, the flange having a face, a perimetrical edge and a dovetail extending along a portion of the perimetrical edge, and wherein the face of the flange is angularly disposed to the central axis at an angle of from 30 to 60 degrees; and a coupling nut, wherein the scalloped edge on the flange of the first mating end slides into and is received by the dovetail and the coupling nut is threaded onto the hub to secure the flange of the first mating end in the dovetail.

10. The adjustable connector according to claim 9, wherein the flange on the second mating end has an outer perimeter and the dovetail extends around about one half of the outer perimeter.

11. The adjustable connector according to claim 10, wherein the dovetail is located on the angularly disposed second mating end at a maximal distance from the second cable connector end.

12. The adjustable connector according to claim 10, wherein the coupling nut contacts the flange of the first mating end at a point opposite the dovetail.

13. The adjustable connector according to claim 9, wherein the hub further comprises an exterior surface and wherein the exterior surface adjacent the second mating end is threaded and adapted to receive the coupling nut.

14. The adjustable connector according to claim 9, wherein the dovetail of the second mating end rotatably receives the flange of the first mating end.

15. The adjustable connector according to claim 9, wherein the flange of the first mating end has indicia of the angular disposition of the adjustable connector and the dovetail of the second mating end has a notch, and wherein the indicia is viewable through the notch when the flange of the first mating end is secured in the dovetail.

16. The adjustable connector according to claim 9, wherein the coupling nut comprises a first end having a perimetrical edge and the scalloped edge of the flange of the first mating end has a plurality of recessed portions, and wherein the perimetrical edge contacts one or more of the recessed portions when the coupling nut is tightened.

17. The adjustable connector according to claim 16, wherein the recessed portions are arranged in a plurality of pairs, and wherein two points on the perimetrical edge of the coupling nut contact one of the pairs when the body is disposed with respect to the hub at an angle of 45, 90 degrees, about 135 degrees or about 180 degrees.

18. The adjustable connector according to claim 9, wherein the dovetail comprises an exterior surface having one or more finger grips.

19. The adjustable connector according to claim 9, wherein the finger grips are formed by one or more protrusions extending radially from the dovetail or one or a plurality of raised members on the dovetail.

20. An adjustable connector for electrical cables, the adjustable connector comprising:

a body having a longitudinal axis and comprising a first cable connector end and a first mating end and an aperture extending therebetween, wherein the first mating end has a flange with a scalloped edge and a substantially flat face that is angularly disposed to the longitudinal axis;

a hub having a central axis and comprising a second cable connector end and a second mating end and an opening extending therebetween, wherein the second mating end has a flange with a perimetrical edge that is angularly disposed to the central axis and a dovetail extending around about one half of the perimetrical edge;

a first coupler having a longitudinal axis and comprising a first mating end having a flange with a scalloped edge and a substantially flat face that is angularly disposed to the longitudinal axis, a second mating end having a flange with a perimetrical edge that is angularly disposed to the longitudinal axis and a dovetail extending around about one half of the perimetrical edge and an axial passage extending therebetween; and a first coupling nut and a second coupling nut, wherein the first coupling nut is threaded onto the hub and the second coupling nut is threaded onto the first coupler, wherein the scalloped edge on the flange of the first coupler slides into and is received by the dovetail and the first coupling nut is tightened to secure the flange of the first coupler in the dovetail of the hub and wherein the scalloped edge on the flange of the first mating end slides into and is received by the dovetail and the second coupling nut is tightened to secure the flange of the first mating end in the dovetail of the first coupler.

21. The adjustable connector according to claim 20, wherein the flange on the second mating end has an outer perimeter and the dovetail extends around about one half of the outer perimeter and wherein the flange on the first coupler has an outer perimeter and the dovetail extends around about one half of the outer perimeter.

22. The adjustable connector according to claim 20, wherein the dovetail of the hub rotatably receives the flange of the first coupler and wherein the dovetail of the first coupler rotatably receives the flange of the body.

23. The adjustable connector according to claim 20, wherein the flange of the body has first indicia of the angular disposition of the body in relation to the first coupler and the dovetail of the first coupler has a notch, wherein the first indicia is viewable through the notch when the flange of the body is secured in the dovetail of the first coupler, and wherein the flange of the first coupler has second indicia of the angular disposition of the first coupler in relation to the hub and the dovetail of the hub has a notch, wherein the second indicia is viewable through the notch when the flange of the first coupler is secured in the dovetail of the hub.

24. The adjustable connector according to claim 20, wherein the body is connected to the first coupler and the first coupler is connected to the hub and the longitudinal axis of the body is substantially parallel to the central axis of the hub or the longitudinal axis of the body is disposed with respect to the central axis of the hub at an angle of about 45 degrees, about 90 degrees, about 135 degrees or about 180 degrees.

25. The adjustable connector according to claim 20, wherein the first coupler comprises a stem section comprising the first mating end and a stem end and a base section comprising the second mating end and a sleeve end, wherein the stem end is inserted through the second coupling nut and rotatably received by the sleeve end, and wherein the stem section freely rotates with respect to the base section until the second coupling nut is tightened.

26. The adjustable connector according to claim 20, further comprising a second coupler, wherein the second coupler is the same as the first coupler, and wherein the second coupler is connected to the first coupler and the body or the hub.

\* \* \* \* \*